(12) United States Patent
Kajiya et al.

(10) Patent No.: US 10,350,791 B2
(45) Date of Patent: Jul. 16, 2019

(54) MASTER MANUFACTURING METHOD, MASTER, AND OPTICAL BODY

(71) Applicant: DEXERIALS CORPORATION, Tokyo (JP)

(72) Inventors: Shunichi Kajiya, Tokyo (JP); Hideki Terashima, Tokyo (JP); Yuichi Arisaka, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 94 days.

(21) Appl. No.: 15/545,857

(22) PCT Filed: Mar. 30, 2016

(86) PCT No.: PCT/JP2016/060555
§ 371 (c)(1),
(2) Date: Jul. 24, 2017

(87) PCT Pub. No.: WO2016/159180
PCT Pub. Date: Oct. 6, 2016

(65) Prior Publication Data
US 2018/0015641 A1    Jan. 18, 2018

(30) Foreign Application Priority Data

Mar. 31, 2015  (JP) ................................. 2015-071844

(51) Int. Cl.
*B29C 33/38*       (2006.01)
*G02B 1/111*       (2015.01)
(Continued)

(52) U.S. Cl.
CPC .......... *B29C 33/3878* (2013.01); *B29C 33/38* (2013.01); *B29C 59/026* (2013.01);
(Continued)

(58) Field of Classification Search
CPC .................................................. B29C 33/3878
(Continued)

(56) References Cited

U.S. PATENT DOCUMENTS

2011/0003121 A1    1/2011   Tsuda

FOREIGN PATENT DOCUMENTS

JP          05-121311       5/1993
JP       2009-128539        6/2009
(Continued)

OTHER PUBLICATIONS

Oct. 4, 2018, Korean Office Action issued for related KR application No. 10-2017-7028234.
(Continued)

*Primary Examiner* — Roberts P Culbert
(74) *Attorney, Agent, or Firm* — Paratus Law Group, PLLC

(57) ABSTRACT

There is provided a new and improved master manufacturing method, master, and optical body enabling more consistent production of optical bodies having a desired haze value, the master manufacturing method including: forming a first micro concave-convex structure, in which an average cycle of concavities and convexities is less than or equal to visible light wavelengths, on a surface of a base material body that includes at least a base material; forming an inorganic resist layer on the first micro concave-convex structure; forming, on the inorganic resist layer, an organic resist layer including an organic resist and filler particles distributed throughout the organic resist; and etching the organic resist layer and the inorganic resist layer to thereby superimpose and form on the surface of the base material a macro concave-convex structure and a second micro concave-convex structure.

9 Claims, 15 Drawing Sheets

(51) Int. Cl.
- *G02B 5/02* (2006.01)
- *B29C 59/02* (2006.01)
- *G02B 1/118* (2015.01)
- *G02B 5/18* (2006.01)
- *G02F 1/1335* (2006.01)
- *B29C 59/04* (2006.01)

(52) U.S. Cl.
CPC .............. *G02B 1/111* (2013.01); *G02B 1/118* (2013.01); *G02B 5/02* (2013.01); *G02B 5/0226* (2013.01); *G02B 5/1809* (2013.01); *B29C 59/04* (2013.01); *G02B 5/0215* (2013.01); *G02B 5/0294* (2013.01); *G02F 1/133504* (2013.01)

(58) Field of Classification Search
USPC ......................................................... 216/24
See application file for complete search history.

(56) References Cited

FOREIGN PATENT DOCUMENTS

| | | |
|---|---|---|
| JP | 2009-128541 | 6/2009 |
| JP | 2009-128543 | 6/2009 |
| JP | 2009-288337 | 12/2009 |
| JP | 2012-001000 | 1/2012 |
| JP | 4916597 B2 | 4/2012 |
| JP | 2014-043068 | 3/2014 |
| WO | WO 2009/144970 A1 | 12/2009 |
| WO | WO 2014/076983 A1 | 5/2014 |

OTHER PUBLICATIONS

Nov. 20, 2018, Japanese Office Action issued for related JP application No. 2015-071844.

x500 TILT 45 DEGREES x5K TILT 45 DEGREES x20K TILT 45 DEGREES

MASTER MANUFACTURING METHOD, MASTER, AND OPTICAL BODY

CROSS REFERENCE TO PRIOR APPLICATION

This application is a National Stage Patent Application of PCT International Patent Application No. PCT/JP2016/060555 (filed on Mar. 30, 2016) under 35 U.S.C. § 371, which claims priority to Japanese Patent Application No. 2015-071844 (filed on Mar. 31, 2015), which are all hereby incorporated by reference in their entirety.

TECHNICAL FIELD

The present invention relates to a master manufacturing method, a master, and an optical body.

BACKGROUND ART

Typically, with display devices such as televisions, and optical elements such as camera lenses, in order to reduce surface reflections and increase transmitted light, an anti-reflection treatment is performed on the light-incident surface. For example, one proposal for such an anti-reflection treatment is to laminate, onto the light-incident surface, an optical body on which is formed a micro concave-convex structure in which the average cycle of the concavities and convexities is less than or equal to the visible light wavelengths (such as a moth-eye structure, for example).

At the surface having such a micro concave-convex structure, a refractive index changes gradually with respect to incident light, and thus a steep change in refractive index, which causes reflection, does not occur. Accordingly, forming such a micro concave-convex structure on the light incident surface prevents reflection of incident light for a wide wavelength region.

Regarding the method of forming a micro concave-convex structure at the nanometer scale, for example, Patent Literature 1 discloses a method of performing dry etching by using island-shaped nanoparticles as a protective mask. Also, Patent Literature 2 and 3 disclose methods of using the anodic oxidation of an aluminum film to form a micro concave-convex structure having multiple sub-micrometer concavities in the aluminum film. Furthermore, Patent Literature 4 discloses a method of using electron-beam lithography to form a micro concave-convex structure in which the average cycle of the concavities and convexities is less than or equal to a certain wavelength.

In addition, Patent Literature 1 and 2 also disclose that it is possible to form a transfer product to which the micro concave-convex structure has been transferred by pressing a structure on which has been formed such a micro concave-convex structure into a resin or the like.

Note that regarding a method of treating a structure on which has been formed the micro concave-convex structure as a mold to form a transfer product to which the micro concave-convex structure has been transferred, for example, the technology disclosed in Patent Literature 5 below is also known. Specifically, Patent Literature 5 discloses that by pressing a roll-shaped mold, on the outer circumferential surface of which a fine pattern has been formed, into a film or the like while also rotating the mold, it is possible to transfer the fine pattern onto a film of large surface area.

Also, in recent years, even higher optical characteristics are being demanded of optical bodies. From such a perspective, with Patent Literature 2 to 4, the anti-reflection function described above as well as an anti-glare function are conferred to an optical body. Specifically, with Patent Literature 2, there is prepared an aluminum film on the surface of which are distributed coarse crystal particles, and then anodic oxidation and etching are repeatedly performed on the aluminum film. With this arrangement, an aluminum film in which a micro concave-convex structure is superimposed onto the rough surface of the aluminum film is produced. Additionally, with Patent Literature 3 and 4, the surface of a substrate is roughened by a mechanical or chemical method, and a micro concave-convex structure is superimposed onto the rough surface. According to these technologies, an anti-glare function is realized by the rough surface formed on the substrate, while an anti-reflection function is realized by the micro concave-convex structure superimposed onto the rough surface.

CITATION LIST

Patent Literature

Patent Literature 1: JP 2012-1000A
Patent Literature 2: JP 4916597B
Patent Literature 3: JP 2009-288337A
Patent Literature 4: JP 2009-128541A
Patent Literature 5: JP 2014-43068A

SUMMARY OF INVENTION

Technical Problem

Meanwhile, the haze value is known as an evaluation indicator of an anti-glare function. The haze value is an indicator expressing the turbidity (cloudiness) of an optical body. As the haze value increases, the light-scattering properties of the optical body increase, and thus the anti-glare function increases. Additionally, for optical body manufacturing technologies, there is demand to be able to consistently manufacture optical bodies having a desired haze value. However, the optical bodies produced by the technologies disclosed in Patent Literature 2 to 4 are problematic in that there is extremely large individual variation in the haze value. Accordingly, the present invention has been devised in light of the above problem, and an objective of the present invention is to provide a new and improved master manufacturing method, master, and optical body enabling more consistent production of optical bodies having a desired haze value.

Solution to Problem

According to an aspect of the present invention in order to achieve the above object, there is provided a master manufacturing method, including: a first step of forming a first micro concave-convex structure, in which an average cycle of concavities and convexities is less than or equal to visible light wavelengths, on a surface of a base material body that includes at least a base material; a second step of forming an inorganic resist layer on the first micro concave-convex structure; a third step of forming, on the inorganic resist layer, an organic resist layer including an organic resist and filler particles distributed throughout the organic resist; and a fourth step of etching the organic resist layer and the inorganic resist layer to thereby superimpose and form on the surface of the base material a macro concave-convex structure in which the average cycle of concavities and convexities is greater than visible light wavelengths, and a second micro concave-convex structure in which the average cycle of concavities and convexities is less than or equal to visible light wavelengths. An average grain size of the filler particles is greater than visible light wavelengths. An etch rate of the filler particles is different from an etch rate of the organic resist.

Herein, the etch rate of the filler particles may be higher than the etch rate of the organic resist.

The average grain size of the filler particles may be from 2 μm to 15 μm.

In the fourth step, the organic resist layer and the inorganic resist layer may be etched by dry etching. An etching gas used when dry-etching the organic resist layer may be different from an etching gas used when dry-etching the inorganic resist layer.

The etching gas used when dry-etching the organic resist layer may include a first etching gas and a second etching gas. The etch rate of the organic resist with respect to the first etching gas may be higher than the etch rate of the inorganic resist layer with respect to the first etching gas. The etch rate of the organic resist with respect to the second etching gas may be lower than the etch rate of the inorganic resist layer with respect to the second etching gas.

The etching gas used in the dry etching may include one or more types of atoms selected from a group consisting of carbon atoms, fluorine atoms, oxygen atoms, and hydrogen atoms.

The first step may include a step of producing the base material body by forming a base material resist layer on the surface of the base material, and a step of forming the first micro concave-convex structure in the base material resist layer. The etch rate of the base material resist layer may be different from the etch rate of the inorganic resist layer.

The base material body may be made of the base material. The first step may include a step of forming a base material resist layer on the surface of the base material, a step of forming a third micro concave-convex structure having a same arrangement pattern as the first micro concave-convex structure in the base material resist layer, and a step of forming the first micro concave-convex structure on the surface of the base material by etching the base material resist layer.

The second step may include a step of forming a first inorganic resist layer on the first micro concave-convex structure, and a step of forming a second inorganic resist layer on the first inorganic resist layer.

According to another aspect of the present invention, there is provided a master manufactured by the above master manufacturing method.

According to another aspect of the present invention, there is provided an optical body, to which is transferred the macro concave-convex structure and the second micro concave-convex structure formed on the above master.

According to the above aspect of the present invention, by adjusting the average grain size and concentration of filler particles, the average cycle of a macro concave-convex structure formed on a master can be adjusted. Furthermore, by adjusting factors such as the ratio of the etch rate of an organic resist and the etch rate of an inorganic resist layer, the arithmetic average roughness of a second micro concave-convex structure formed on the master may be adjusted. Consequently, an optical body having the desired arithmetic average roughness and average cycle can be produced consistently. In addition, although described in detail later, there is a correlation between the arithmetic average roughness and average cycle of an optical body, and the haze value of the optical body. Consequently, an optical body having a desired haze value can be produced more consistently.

ADVANTAGEOUS EFFECTS OF INVENTION

According to the present invention as described above, an optical body having a desired haze value can be produced more consistently.

DESCRIPTION OF EMBODIMENTS

<1. Master>
[1.1. Structure of Master]

Figure 1:
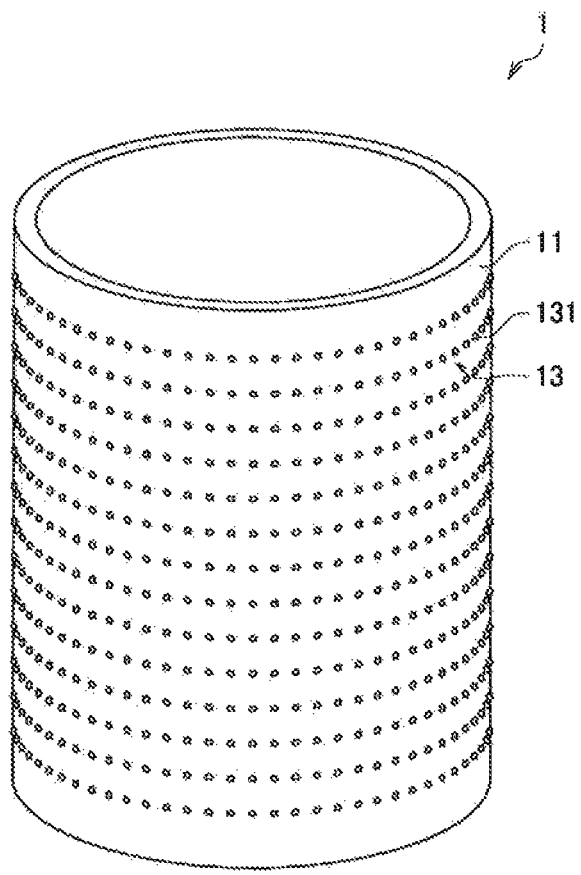
FIG. 1 is a perspective diagram illustrating an exemplary appearance of a master according to the present embodiment.
Figure 2:
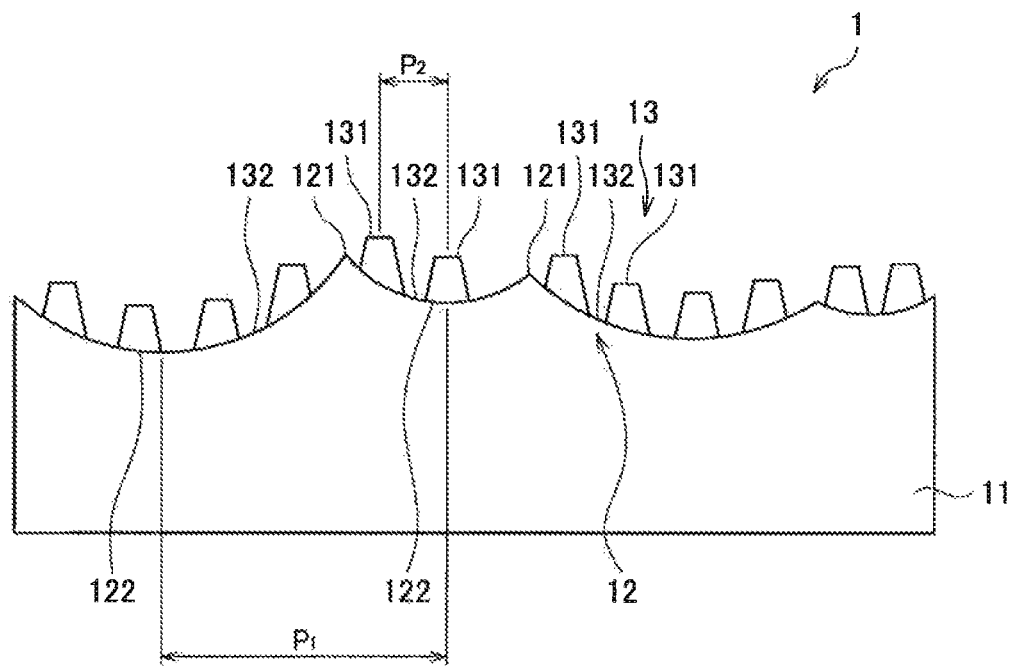
FIG. 2 is a cross-section diagram that schematically illustrates the surface shape of a master.
Figure 3:
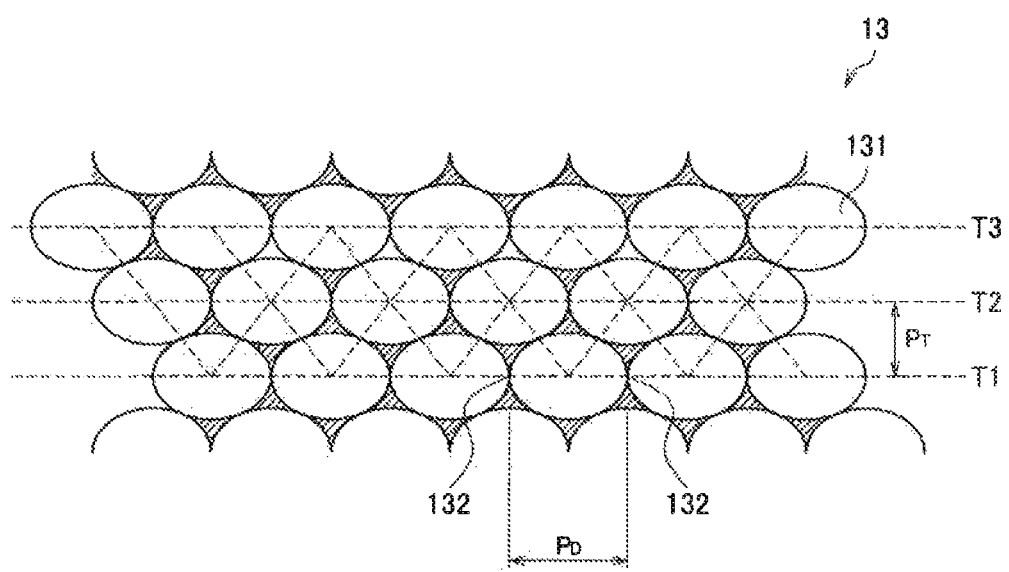
FIG. 3 is a plan view that schematically illustrates the surface shape of a master.

First, a configuration of a master 1 according to the present embodiment will be described with reference to FIG. 1 to 3. FIG. 1 is a perspective diagram illustrating an exemplary appearance of the master 1, while FIG. 2 is a cross-section diagram that schematically illustrates the surface shape of the master 1, and FIG. 3 is a plan view that schematically illustrates the surface shape of the master. Note that FIG. 2 is a cross-section diagram obtained by cutting the master 1 by a plane that passes through the central axis of the master 1, and is also parallel to the central axis. The horizontal direction in FIG. 3 is aligned with the circumferential direction of the master 1, while the vertical direction is aligned with the axial direction of the master 1. As illustrated in FIG. 1, the master 1 is a master used in a nanoimprint method, and has a hollow round cylindrical shape, for example. The master 1 may also have a round columnar shape, or another shape (for example, a planar shape). However, in the case in which the master 1 has a round columnar or hollow round cylindrical shape, a concave-convex structure of the master 1 may be transferred seamlessly to a resin base material or the like with a roll-to-roll method. With this arrangement, an optical body 4 onto which the concave-convex structure of the master 1 has been transferred (see FIG. 15) may be produced with high production efficiency. From such a perspective, the shape of the master 1 is preferably a hollow round cylindrical shape or a round columnar shape. Note that the optical body 4 onto which a concave-convex structure is transferred by the master 1 according to the present embodiment is used as an anti-reflective film or the like, for example. Note that in FIG. 1, of a macro concave-convex structure 12 and a micro concave-convex structure 13 to be described later, only the micro concave-convex structure 13 is illustrated. In actuality, the macro concave-convex structure 12 and the micro concave-convex structure 13 are formed superimposed onto the surface of a base material 11.

As illustrated in FIG. 2, the master 1 according to the present embodiment is provided with a base material 11, a macro concave-convex structure 12 formed on the surface of the base material 11, and a micro concave-convex structure 13 (second micro concave-convex structure) superimposed onto the macro concave-convex structure 12.

The base material 11 is a glass body, for example, and specifically is formed from quartz glass. However, the base material 11 is not particularly limited insofar as the $SiO_2$ purity is high, and may also be formed from a material such as fused quartz glass or synthetic quartz glass. The shape of the base material 11 is a hollow round cylindrical shape, but may also be a round columnar shape, or some other shape. However, as discussed above, the base material 11 preferably has a hollow round cylindrical shape or a round columnar shape.

The macro concave-convex structure 12 is a concave-convex structure formed on the base material 11, and as illustrated in FIG. 2, includes convexities 121 which are convex in the film-thickness direction of the base material 11, and concavities 122 which are concave in the film-thickness direction of the base material 11. The average cycle of the concavities and convexities of the macro concave-convex structure 12 is greater than the visible light wavelengths (for example, exceeding 830 nm), and preferably more than or equal to 1 μm and less than or equal to 100 μm. Consequently, the macro concave-convex structure 12 forms what is called an anti-glare structure. The average cycle (=Rsm) of the macro concave-convex structure 12 is the arithmetic average value of the distance P1 between neighboring convexities 121 and between neighboring concavities 122. Note that a method of calculating the average cycle is as follows, for example. Namely, multiple pairs of neighboring convexities 121 and pairs of neighboring concavities 122 are picked up, and the distance P1 therebetween is measured. Subsequently, the average cycle may be calculated by taking the arithmetic average of the measured values.

The micro concave-convex structure 13 is a concave-convex structure superimposed onto the macro concave-convex structure 12. As illustrated in FIG. 2, the micro concave-convex structure 13 includes concavities 132 which are concave in the film-thickness direction of the base material 11, and convexities 131 which are positioned between mutually adjacent concavities 132 and 132. Note that in FIG. 2, multiple convexities 131 are disposed with spacing between each other, but as illustrated in FIG. 3, the convexities 131 may also be adjacent to each other. Also, as illustrated in the diagram, the micro concave-convex structure 13 may also be disposed periodically on the base material 11. In the example of FIG. 3, the convexities 131 and the concavities 132 are arranged in a staggered pattern. Specifically, on the surface of the master 1, multiple tracks extending in the circumferential direction (for example, tracks T1 to T3) are disposed at equal intervals in the axial direction, while the convexities 131 and the concavities 132 are disposed at equal intervals in each track. Also, the convexities 131 in adjacent tracks are disposed offset from each other in the circumferential direction by one-half of one of the convexities 131.

The average cycle of the concavities and convexities of the micro concave-convex structure 13 is less than or equal to the visible light wavelengths (for example, less than or equal to 830 nm), preferably more than or equal to 100 nm and less than or equal to 350 nm, and more preferably more than or equal to 150 nm and less than or equal to 280 nm. Consequently, the micro concave-convex structure 13 has what is called a moth-eye structure. Herein, if the average cycle is less than 100 nm, there is a possibility that the formation of the micro concave-convex structure 13 may become difficult, which is not preferable. Also, if the average cycle exceeds 350 nm, in the optical body 4 to which the concave-convex structure of the master 1 is transferred, there is a possibility that a diffraction phenomenon of visible light may occur, which is not preferable.

The average cycle of the micro concave-convex structure 13 is the arithmetic average value of the distance P2 (see FIG. 2) between neighboring convexities 131 and between neighboring concavities 132. Note that a method of calculating the average cycle is as follows, for example. Namely, multiple pairs of neighboring concavities 132 and pairs of neighboring convexities 131 are picked up, and the distance P2 therebetween is measured. Herein, as illustrated in FIG. 3, the distance P2 is categorized into a track pitch $P_T$ and a dot pitch $P_D$. The track pitch $P_T$ is the distance P2 between the convexities 131 (or the concavities 132) disposed in adjacent tracks, while the dot pitch $P_D$ is the distance P2 between the convexities 131 (or the concavities 132) disposed in the same track. Subsequently, the average cycle may be calculated by taking the arithmetic average of the measured values. Note that the average cycles of the various concave-convex structures in the present embodiment are measured by methods similar to the above.

Note that the two-dimensional arrangement of the micro concave-convex structure 13 obviously is not limited to the example of FIG. 3. For example, the multiple rows of tracks in which the convexities 131 and the concavities 132 are arranged may be straight or curved. Also, the convexities 131 and the concavities 132 may be arranged not in a staggered pattern, but instead so that the convexities 131 and the concavities 132 are positioned at the vertices of a rectangle, for example. In this case, the convexities 131 and the concavities 132 are arranged in a rectangular lattice. Also, the micro concave-convex structure 13 may be disposed randomly. Even in this case, the average cycle of the micro concave-convex structure 13 is still required to be less than or equal to the visible light wavelengths.

As described above, the master 1 according to the present embodiment has a structure in which the macro concave-convex structure 12 and the micro concave-convex structure 13 are superimposed onto the surface of the base material 11. Consequently, the optical body 4 to which the concave-convex structure of the master 1 has been transferred has a surface shape onto which a macro concave-convex structure 41 and a micro concave-convex structure 42 are superimposed (see FIG. 15). With this arrangement, the optical body 4 is able to jointly exhibit an anti-glare function due to the macro concave-convex structure 12, and an anti-reflection function due to the micro concave-convex structure 13.

[1.2. Master Manufacturing Method]

Next, an example of a master manufacturing method will be described with reference to FIGS. 4 to 10.

(First Step)

Figure 4:
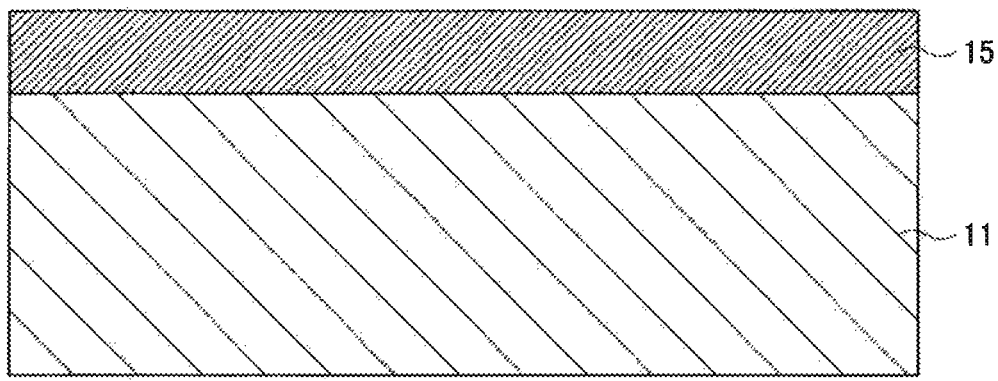
FIG. 4 is a cross-section diagram for explaining each step of a master manufacturing method.

First, as illustrated in FIG. 4, a base material resist layer 15 is formed (deposited) on the base material 11, for example. With this arrangement, a base material body is produced. In other words, in this example, the base material body is made up of the base material 11 and the base material resist layer 15. Subsequently, a first micro concave-convex structure, namely a micro concave-convex structure 15B, is formed in the base material resist layer 15. At this point, the resist constituting the base material resist layer 15 is not particularly limited, and may be either an organic resist or an inorganic resist. Examples of organic resists include novolac-type resist and chemically-amplified resist. Also, examples of inorganic resists include metallic oxides including one or multiple types of transition metals such as tungsten (W) or molybdenum (Mo). However, in order to conduct thermal reaction lithography, the base material resist layer 15 preferably is formed with a thermo-reactive resist including a metallic oxide.

In the case of using an organic resist, the base material resist layer 15 may be formed on the base material 11 by using a process such as spin coating, slit coating, dip coating, spray coating, or screen printing. Also, in the case of using an inorganic resist for the base material resist layer 15, the base material resist layer 15 may be formed by sputtering.

Figure 5:
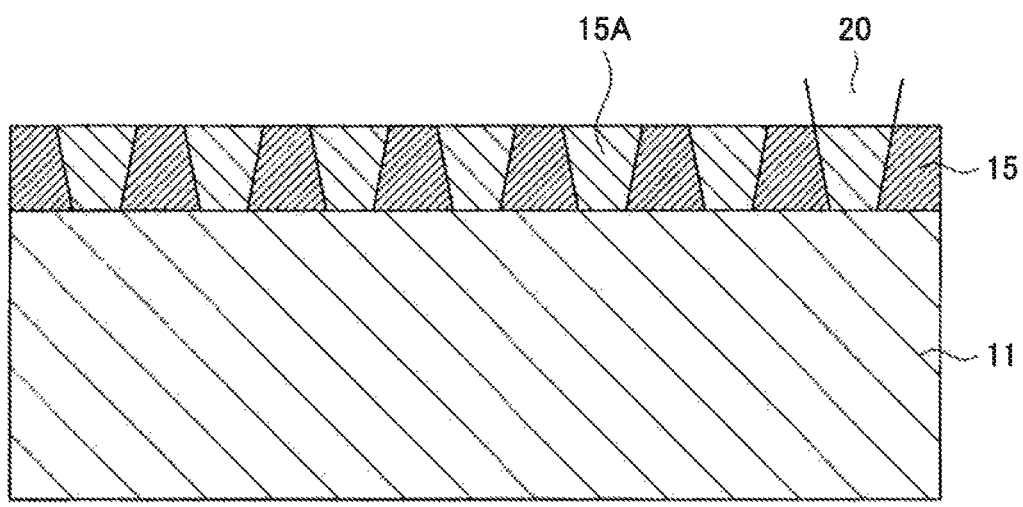
FIG. 5 is a cross-section diagram for explaining each step of a master manufacturing method.

Next, as shown in FIG. 5, by exposing part of the base material resist layer 15 with an exposure device 200 (see FIG. 13), a latent image 15A is formed on the base material resist layer 15. Specifically, the exposure device 200 modulates laser light 20, and irradiates the base material resist layer 15 with the laser light 20. Consequently, part of the base material resist layer 15 irradiated by the laser light 20 denatures, and thus a latent image 15A corresponding to the micro concave-convex structure 13 may be formed in the base material resist layer 15. The latent image 15A is formed in the base material resist layer 15 at an average cycle less than or equal to the visible light wavelengths.

Figure 6:
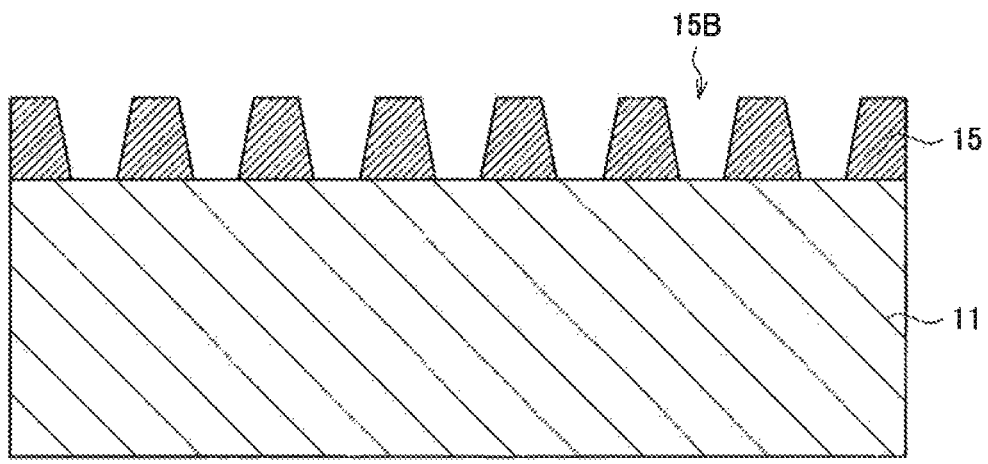
FIG. 6 is a cross-section diagram for explaining each step of a master manufacturing method.

Next, as illustrated in FIG. 6, by dripping a developing solution onto the base material resist layer 15 in which is formed the latent image 15A, the base material resist layer 15 is developed. With this arrangement, the micro concave-convex structure 15B (first micro concave-convex structure) is formed in the base material resist layer 15. Note that in the case in which the base material resist layer 15 is a positive resist, the exposed part which is exposed by the laser light 20 (that is, the portion where the latent image 15A is formed) is removed by the developing process, because the dissolution rate with respect to the developing solution is increased compared to the unexposed part. In this case, a micro concave-convex structure 15B is formed in which the exposed part becomes the concavities, and the unexposed part becomes the convexities. On the other hand, in the case in which the base material resist layer 15 is a negative resist, the exposed part which is exposed by the laser light 20 has a lower dissolution rate with respect to the developing solution compared to the unexposed part, and thus the unexposed part is removed by the developing process. In this case, a micro concave-convex structure 15B is formed in which the exposed part becomes the convexities, and the unexposed part becomes the concavities.

(Second Step)

Figure 7:
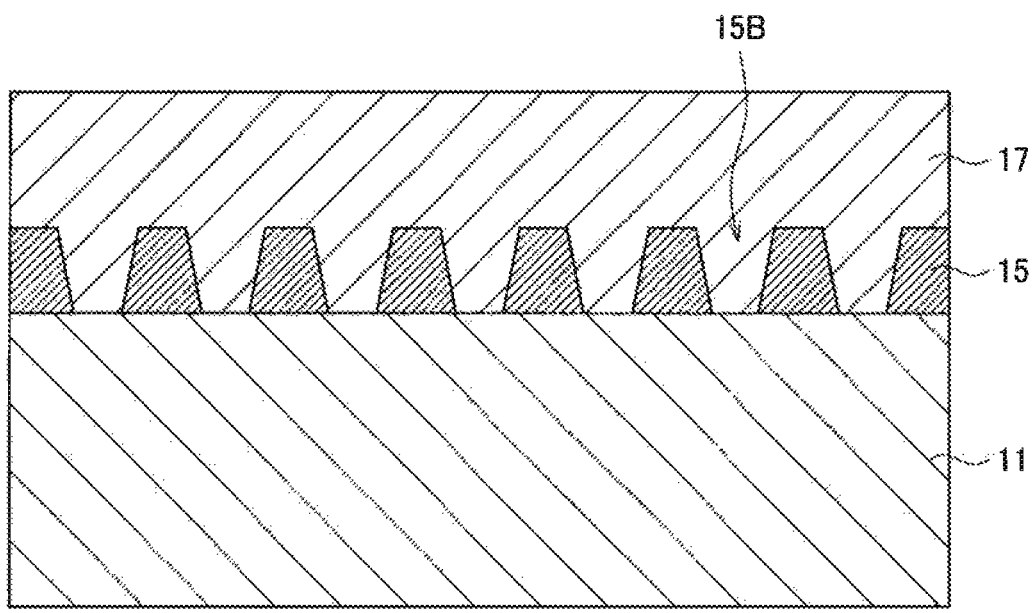
FIG. 7 is a cross-section diagram for explaining each step of a master manufacturing method.

Next, as illustrated in FIG. 7, an inorganic resist layer 17 is formed (deposited) on the micro concave-convex structure 15B (that is, on the base material resist layer 15) so as to embed the micro concave-convex structure 15B. The inorganic resist constituting the inorganic resist layer 17 may be, for example, $SiO_2$, Si, diamond-like carbon (DLC), W, Mo, or a metallic oxide including one or multiple types of transition metals such as W and Mo. The inorganic resist layer 17 is formed on the micro concave-convex structure 15B by a method such as sputtering or chemical vapor deposition (CVD). In this way, in the present embodiment, the inorganic resist layer 17 is formed in a state in which the micro concave-convex structure 15B of the base material resist layer 15 still remains. The reasons for this are as follows.

Namely, the inventors discovered that if the processes in the present second step and thereafter are performed after forming a micro concave-convex structure 14 (see FIG. 12) on the base material 11, the micro concave-convex structure 13 is either not formed on the base material 11, or even if formed, the aspect ratio is greatly different from the aspect ratio of the micro concave-convex structure 15B in some cases. This tendency is particularly noticeable in the case of attempting to form a micro concave-convex structure 13 with a high aspect ratio (for example, 1 or greater). Note that the aspect ratio of a micro concave-convex structure is the value obtained by dividing the distance between the convexities or between the concavities (for example, the distance P2 illustrated in FIG. 2) by the height of the convexities or the depth of the concavities.

On the other hand, if the processes in the second step and thereafter are performed in a state in which the micro concave-convex structure 15B of the base material resist layer 15 still remains, a micro concave-convex structure 13 having a desired aspect ratio can be formed consistently on the base material 11. For this reason, in the present embodiment, the inorganic resist layer 17 is formed in a state in which the micro concave-convex structure 15B of the base material resist layer 15 still remains. Note that even in the case of forming the inorganic resist layer 17 after forming the micro concave-convex structure 14 on the base material 11, according to a second modification described later, a micro concave-convex structure 13 having a desired aspect ratio can be formed. The second modification will be described later.

At this point, the inorganic resist constituting the inorganic resist layer 17 is selected so that the etch rate of the inorganic resist layer 17 is different from the etch rate of the base material resist layer 15. As described later, since the inorganic resist layer 17 and the base material resist layer 15 are etched at the same time, in the hypothetical case in which both have the same etch rate, both will be etched equally. In this case, the micro concave-convex structure 13 cannot be formed on the surface of the base material 11. For example, in the case in which the base material resist layer 15 is made up of a metallic oxide such as tungsten oxide, it is sufficient for the inorganic resist layer 17 to be made up of $SiO_2$, Si, or the like.

The thickness of the inorganic resist layer 17 is not particularly limited, and may be from 500 nm to 1500 nm, for example. Note that the inventors attempted to form an organic resist layer 19 described later on the micro concave-convex structure 15B while omitting the inorganic resist layer 17. However, in this case, the micro concave-convex structure 13 was not formed on the base material 11, even after etching the organic resist layer 19 and the like. The cause cannot be specified clearly, but is thought to be because of the organic resist 191 exerting some kind of negative influence on the base material resist layer 15 and the base material 11. On the other hand, in the case in which the inorganic resist layer 17 is interposed between the micro concave-convex structure 15B and the organic resist layer 19 (the case of the present embodiment), the micro concave-convex structure 13 can be formed on the base material 11.

(Third Step)

Figure 8:
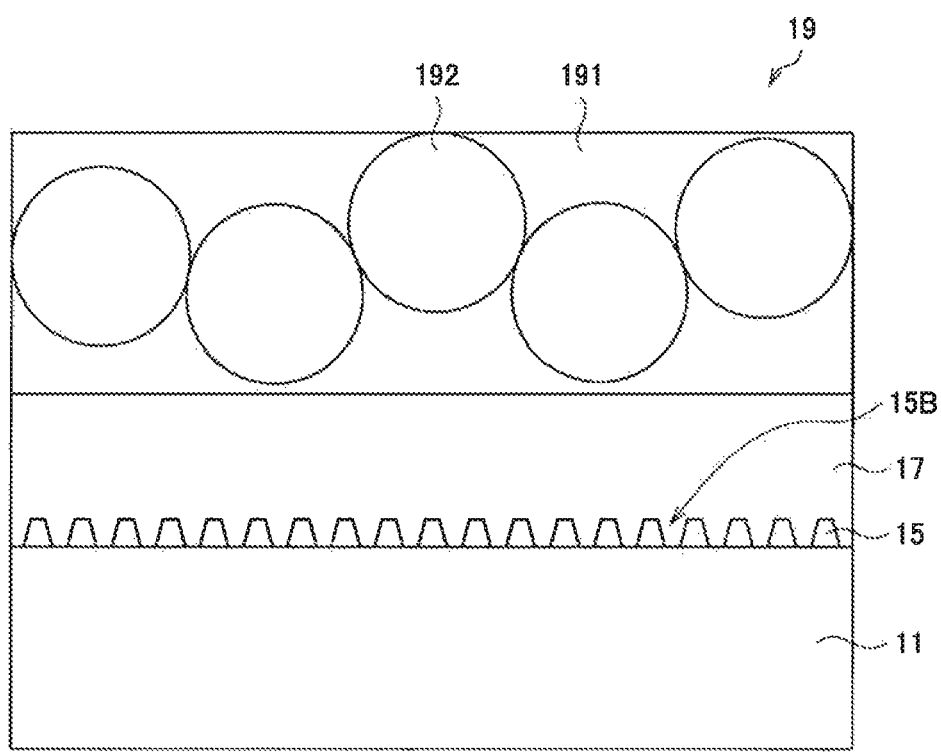
FIG. 8 is a cross-section diagram for explaining each step of a master manufacturing method.

Next, as illustrated in FIG. 8, the organic resist layer 19 is formed on the inorganic resist layer 17. Herein, the organic resist layer 19 includes an organic resist 191, and filler particles 192 distributed throughout the organic resist 191. The organic resist layer 19 is formed on the inorganic resist layer 17 by using a process such as spin coating, slit coating, dip coating, spray coating, or screen printing, for example. Among these, the spray coating is particularly preferable, because a thin organic resist layer 19 can be formed uniformly and continuously. The spray coater used in the spray coating method may be any kind of typical spray coater. For example, a needle-type spray coater may be used.

The organic resist 191 is not particularly limited, and may be novolac-type resist, chemically-amplified resist, or the like, for example. The filler particles 192 are made up of a material having a different etch rate than the etch rate of the organic resist 191. In other words, in the present embodiment, the difference between the etch rate of the filler particles 192 and the etch rate of the organic resist 191 is utilized to form a macro concave-convex structure 19A on the surface of the organic resist layer 19. Herein, the etch rates of the organic resist 191 and the filler particles 192 specifically are the etch rates with respect to a macro concave-convex structure-forming gas described later.

Herein, the etch rate of the filler particles 192 is preferably higher than the etch rate of the organic resist 191. Note that in the following description, the content of the present embodiment is described under the presupposition that the etch rate of the filler particles 192 is higher than the etch rate of the organic resist 191. Obviously, as described above, it is sufficient for the etch rate of the filler particles 192 to be different from the etch rate of the organic resist 191. Materials selectable as the material of the filler particles 192 include various types of acrylic resins, carbon particles, hollow silica, and the like, for example.

Additionally, the average grain size of the filler particles 192 is greater than the visible light wavelengths. Note that the average grain size of the filler particles 192 is the value obtained by taking the arithmetic average of the sphere-equivalent diameter (distance across) of the filler particles 192, and is measurable with a device such as a laser diffraction particle size distribution measuring device, a microscope, or a scanning electron microscope (SEM), for example.

Figure 9:
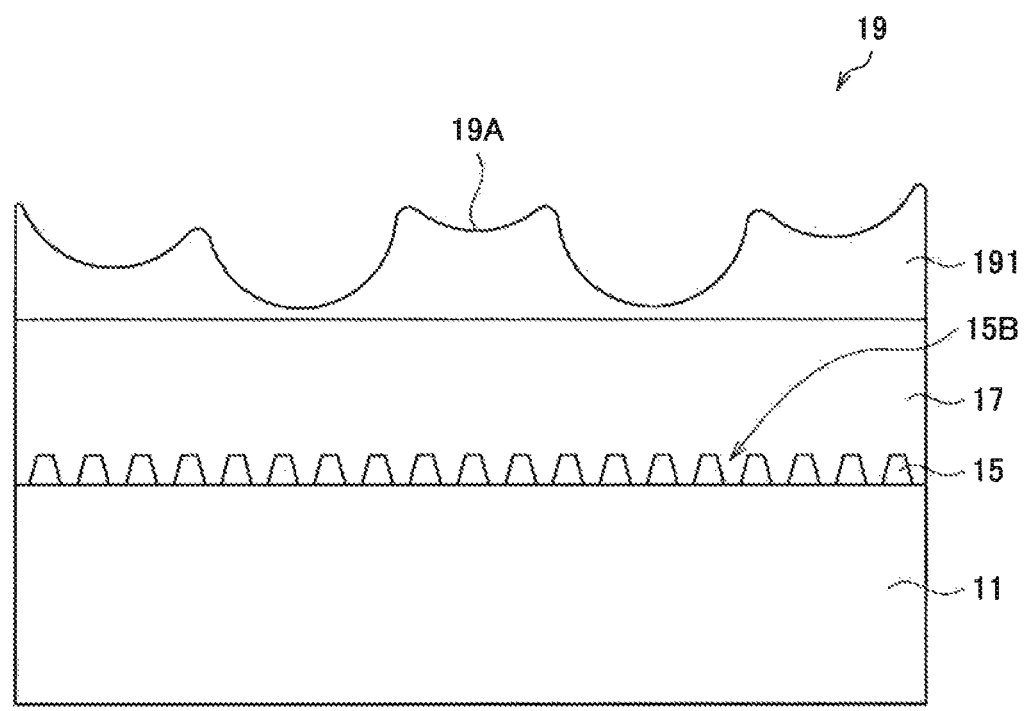
FIG. 9 is a cross-section diagram for explaining each step of a master manufacturing method.

By setting the etch rate and the average grain size of the filler particles 192 as above, the following advantageous effects are obtained. Namely, as described later, the organic resist layer 19 is etched by an etching gas (macro concave-convex structure-forming gas). Herein, the filler particles 192 are etched at a higher etch rate than the organic resist 191. Consequently, as the etching of the organic resist layer 19 proceeds, on the surface of the organic resist layer 19, there is formed a concave-convex structure approximately matching the shape of the interface between the filler particles 192 and the organic resist 191 disposed underneath the filler particles 192, as illustrated in FIG. 9. After that, the organic resist layer 19 is etched while maintaining this concave-convex structure.

Herein, since the average grain size of the filler particles 192 is greater than the visible light wavelengths, the average cycle of the concave-convex structure is also greater than the visible light wavelengths. Consequently, the concave-convex structure becomes the macro concave-convex structure 19A. In other words, by setting the etch rate and the average grain size of the filler particles 192 as above, the macro concave-convex structure 19A can be formed in the organic resist layer 19.

Furthermore, by adjusting the average grain size of the filler particles 192 and their concentration inside the organic resist layer 19, the average cycle of the macro concave-convex structure 19A may be adjusted to a desired value. For example, by increasing the average grain size of the filler particles 192, the average cycle can be increased. Also, by raising the concentration of the filler particles 192, the average cycle can be decreased. In addition, by adjusting the ratio of the etch rate of the organic resist 191 and the etch rate of the filler particles 192, the arithmetic average roughness of the macro concave-convex structure 19A can be adjusted to a desired value. In other words, as these etch rates become closer, the arithmetic average roughness decreases (that is, the macro concave-convex structure 19A becomes flatter), and as these etch rates become farther apart, the arithmetic average roughness increases.

The average grain size of the filler particles 192 is not particularly limited insofar as the average grain size is within a range that is greater than the visible light wavelengths, being preferably from 2 μm to 15 μm, and more preferably from 6 μm to 10 μm. This is because by taking the average grain size of the filler particles 192 to be a value within such a range, the anti-glare function of the optical body 4 can be increased further, and glare in the optical body 4 can be moderated.

Also, in a case in which the average grain size of the filler particles 192 is less than 2 μm, there is a possibility that the macro concave-convex structure 12 cannot be formed on the surface of the base material 11. If the average grain size of the filler particles 192 exceeds 15 μm, the organic resist layer 19 becomes extremely thick. In other words, the organic resist layer 19 is required to be at least ⅓ of the filler particles 192. Consequently, if the average grain size of the filler particles 192 exceeds 15 μm, the organic resist layer 19 also becomes extremely thick. Furthermore, if the organic resist layer 19 becomes thick in this way, the etching takes large amounts of time and effort. Additionally, if the average grain size of the filler particles 192 exceeds 15 μm, there is also a possibility that the filler particles 192 may sink into the organic resist layer 19 due to their own weight. If the filler particles 192 sink down, the organic resist layer 19 substantially separates into an upper layer made up of the organic resist 191, and a lower layer made up of the filler particles 192. In this case, adjusting the arithmetic average roughness by the selectivity ratio of the macro concave-convex structure-forming gas becomes extremely difficult. Although described in detail later, in the present embodiment, the ratio of the etch rate of the organic resist 191 and the etch rate of the inorganic resist layer 17 (in other words, the difference between the two) is utilized to adjust the arithmetic average roughness of a macro concave-convex structure 17A of the inorganic resist layer 17. For example, in a case in which the etch rate of the organic resist 191 is low and the etch rate of the inorganic resist layer 17 is high, the arithmetic average roughness of the macro concave-convex structure 17A increases. However, as described above, if the filler particles 192 sink down, little to none of the organic resist 191 exists on the inorganic resist layer 17. Consequently, utilizing the difference between the two etch rates becomes next to impossible. As a result, adjustment of the arithmetic average roughness of the macro concave-convex structure 17A becomes extremely difficult.

Additionally, the contained amount of the filler particles 192 is not particularly limited insofar as the contained amount is within a range whereby the above advantageous effects are realized, but preferably is at a concentration that is at least enough for the filler particles 192 to be distributed throughout the entire surface of the inorganic resist layer 17. Specifically, the contained amount of the filler particles 192 preferably is kept to within double the solid content mass of the organic resist 191. If the contained amount of the filler particles 192 is increased further, forming the organic resist layer 19 homogeneously on the inorganic resist layer 17 becomes difficult, and by extension, there is an increased possibility that the filler particles 192 may fall off the inorganic resist layer 17.

The thickness of the organic resist layer 19 is not particularly limited insofar as the thickness is at least ⅓ the average grain size of the filler particles 192, but if more than double, for example, the filler particles 192 do not precipitate easily in etching, and there is a possibility of the process time becoming long. For this reason, the thickness of the organic resist layer 19 preferably is less than or equal to double the average grain size of the filler particles 192.

(Fourth Step)

In the fourth step, the organic resist layer 19, the inorganic resist layer 17, the base material resist layer 15, and the base material 11 are etched successively. Herein, the etching of the present embodiment is preferably dry etching that is vertically anisotropic. For example, reactive ion etching (RIE) is preferable. This is because with such an arrangement, the macro concave-convex structure and the micro concave-convex structure formed in each resist layer are transferred to the other resist layers. For example, in the case of etching the organic resist layer 19 by etching having isotropy, such as wet etching, there is a possibility of the micro concave-convex structure 13 not being formed in the base material 11.

Also, the etching gas preferably includes one or more types of atoms selected from a group consisting of carbon atoms, fluorine atoms, oxygen atoms, and hydrogen atoms. For example, the etching gas may be a fluorocarbon gas such as $CHF_3$, $CH_2F_2$, $CF_4$, $C_2F_8$, or $C_3F_8$, or a gas obtained by adding an additive gas such as $O_2$ gas, $H_2$ gas, or Ar gas to a fluorocarbon gas. The specific composition of the etching gas may be selected appropriately depending on the resist to be etched. Details will be described later.

The fourth process is divided into a first etching that transfers the macro concave-convex structure 19A formed in the organic resist layer 19 to the inorganic resist layer 17, and a second etching that superimposes and forms the macro concave-convex structure 12 and the micro concave-convex structure 13 on the base material 11.

(First Etching)

In the first etching, first, the organic resist layer 19 is etched. The etching gas used in the first etching (hereinafter also designated the "macro concave-convex structure-forming gas") includes a first etching gas and a second etching gas. Herein, the etch rate of the organic resist 191 with respect to the first etching gas is higher than the etch rate of the inorganic resist layer 17 with respect to the first etching gas. Herein, the etch rate of the organic resist 191 with respect to the second etching gas is lower than the etch rate of the inorganic resist layer 17 with respect to the second etching gas. The first etching gas is $O_2$ gas, for example, while the second etching gas is a fluorocarbon gas, for example.

By etching the organic resist layer 19, as illustrated in FIG. 9, the macro concave-convex structure 19A is formed on the surface of the organic resist layer 19. The shape of the macro concave-convex structure 19A varies every time the macro concave-convex structure-forming gas etches the filler particles 192. Subsequently, the shape of the macro concave-convex structure 19A becomes fixed when all of the filler particles 192 are etched. After that, the organic resist layer 19 is etched while keeping the shape of the macro concave-convex structure 19A.

Figure 10:
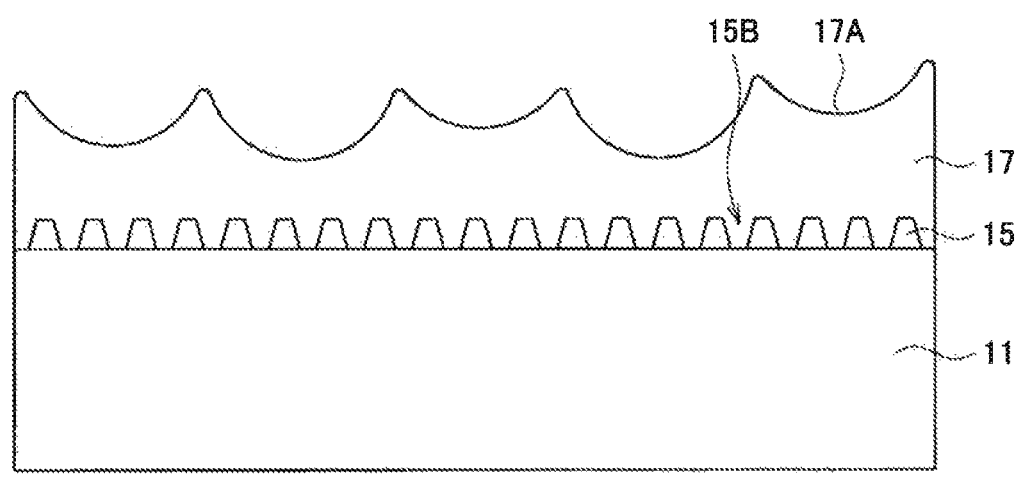
FIG. 10 is a cross-section diagram for explaining each step of a master manufacturing method.

The first etching still continues even after the macro concave-convex structure-forming gas reaches the inorganic resist layer 17. At this point, since the etching is performed by dry etching that is vertically anisotropic, as illustrated in FIG. 10, the macro concave-convex structure 19A is transferred to the inorganic resist layer 17. In other words, the macro concave-convex structure 17A is formed on the surface of the inorganic resist layer 17. The first etching ends when the macro concave-convex structure 19A is entirely transferred to the inorganic resist layer 17.

At this point, the macro concave-convex structure-forming gas is a mixture of the first etching gas and the second etching gas having the properties described above. For this reason, the etch rate of the organic resist 191 with respect to the macro concave-convex structure-forming gas and the etch rate of the inorganic resist layer 17 with respect to the macro concave-convex structure-forming gas are different. In other words, the selectivity ratio of the macro concave-convex structure-forming gas is different. At this point, the selectivity ratio of the macro concave-convex structure-forming gas is the value obtained by dividing the etch rate of the organic resist 191 with respect to the macro concave-convex structure-forming gas by the etch rate of the inorganic resist layer 17 with respect to the macro concave-convex structure-forming gas. Consequently, the shape of the macro concave-convex structure 17A does not match the macro concave-convex structure 19A exactly. Specifically, the arithmetic average roughness of the macro concave-convex structure 17A is different from the arithmetic average roughness of the macro concave-convex structure 19A.

Additionally, the arithmetic average roughness of the macro concave-convex structure 17A is adjustable by adjusting the selectivity ratio of the macro concave-convex structure-forming gas. The method of adjusting the selectivity ratio of the macro concave-convex structure-forming gas may be, for example, adjusting the mixture ratio of the first etching gas and the second etching gas, for example. For example, in the case of increasing the mixture ratio of the first etching gas, the selectivity ratio of the macro concave-convex structure-forming gas increases (in other words, the etch rate of the inorganic resist layer 17 decreases, while the etch rate of the organic resist 191 increases). For this reason, the arithmetic average roughness of the macro concave-convex structure 17A decreases. In other words, the macro concave-convex structure 17A becomes shallower. On the other hand, in the case of increasing the mixture ratio of the second etching gas, the selectivity ratio of the macro concave-convex structure-forming gas decreases (in other words, the etch rate of the inorganic resist layer 17 increases, while the etch rate of the organic resist 191 decreases). For this reason, the arithmetic average roughness of the macro concave-convex structure 17A increases. In other words, the macro concave-convex structure 17A becomes deeper.

In this way, according to the present embodiment, by adjusting the mixture ratio of the first etching gas and the second etching gas, the selectivity ratio of the macro concave-convex structure-forming gas can be adjusted, and by extension, the arithmetic average roughness of the macro concave-convex structure 17A can be adjusted. Note that the selectivity ratio of the macro concave-convex structure-forming gas is also adjustable by adjusting the combination of the organic resist 191 and the inorganic resist constituting the inorganic resist layer 17. Also, the average cycle of the macro concave-convex structure 17A approximately matches the average cycle of the macro concave-convex structure 19A. In this way, in the present embodiment, the average cycle of the macro concave-convex structure 17A can be adjusted by adjusting the average grain size and concentration of the filler particles 192, and the arithmetic average roughness of the macro concave-convex structure 17A can be adjusted by adjusting the selectivity ratio of the macro concave-convex structure-forming gas. Consequently, a macro concave-convex structure 17A having the desired average cycle and arithmetic average roughness can be formed.

Note that the first etching may also be conducted repeatedly before conducting the second etching. By repeatedly conducting the first etching, the average cycle of the macro concave-convex structure 17A can be increased, and the arithmetic average roughness can be decreased.

(Second Etching)

In the second etching, first, the inorganic resist layer 17 is etched. The etching gas used in the second etching (hereinafter also designated the "superimposed structure-forming gas") is not particularly limited insofar as the etching gas is able to etch the inorganic resist layer 17, the base material resist layer 15, and the base material 11. For example, in the case in which the base material 11 is quartz glass, the superimposed structure-forming gas may be a mixture of one or multiple types of fluorocarbon gases. Examples of fluorocarbon gases include $CHF_3$, $CH_2F_2$, $CF_4$, $C_2F_8$, and $C_3F_8$. The superimposed structure-forming gas may also be a gas obtained by adding an additive gas such as $H_2$ gas or Ar gas to these fluorocarbon gases. Note that the superimposed structure-forming gas may additionally include $O_2$ gas, but since $O_2$ gas is greatly isotropic compared to other gases, the concentration of $O_2$ gas is preferably as low as possible. Note that in the first etching, $O_2$ gas is included in the macro concave-convex structure-forming gas. However, in the first etching, only the comparatively large concavities and convexities of the macro concave-convex structure 17A are formed in the inorganic resist layer 17, and thus the macro concave-convex structure-forming gas having some degree of isotropy does not pose any particular problem.

The inorganic resist layer 17 is etched while keeping the shape of the macro concave-convex structure 17A. As the second etching progresses, the superimposed structure-forming gas reaches the base material resist layer 15. After that, the inorganic resist layer 17 existing in the concavities of the micro concave-convex structure 15B and the base material resist layer 15 (that is, the convexities of the micro concave-convex structure 15B) are etched by the superimposed structure-forming gas. As the etching progresses further, the superimposed structure-forming gas reaches the base material 11.

Herein, in the case in which the etch rate of the base material resist layer 15 is higher than the etch rate of the inorganic resist layer 17, the convexities of the micro concave-convex structure 15B disappear earlier than the inorganic resist layer 17 existing in the concavities of the micro concave-convex structure 15B. Consequently, in this case, the base material 11 is etched starting from the portions where the convexities of the micro concave-convex structure 15B existed. As the second etching progresses, the inorganic resist layer 17 existing in the concavities of the micro concave-convex structure 15B also disappear completely. After that, the entire surface of the base material 11 is etched. With this arrangement, a micro concave-convex structure 13 having the inverse shape of the micro concave-convex structure 15B is formed on the surface of the base material 11.

On the other hand, in the case in which the etch rate of the base material resist layer 15 is lower than the etch rate of the inorganic resist layer 17, the inorganic resist layer 17 existing in the concavities of the micro concave-convex structure 15B disappears earlier than the convexities of the micro concave-convex structure 15B. Consequently, in this case, the base material 11 is etched starting from the portions where the concavities of the micro concave-convex structure 15B existed. As the second etching progresses, the convexities of the micro concave-convex structure 15B also disappear completely. After that, the entire surface of the base material 11 is etched. With this arrangement, a micro concave-convex structure 13 having the same arrangement pattern (the arrangement pattern of concavities and convexities) as the micro concave-convex structure 15B is formed on the surface of the base material 11.

While the micro concave-convex structure 13 is formed on the surface of the base material 11, the macro concave-convex structure 17A of the inorganic resist layer 17 is also transferred to the base material 11. The second etching ends when the macro concave-convex structure 17A is entirely transferred to the base material 11. With the above steps, the macro concave-convex structure 12 and the micro concave-convex structure 13 are formed superimposed onto the surface of the base material 11. In other words, the master 1 is produced.

Herein, in the case in which the inorganic resist constituting the inorganic resist layer 17 and the material of the base material 11 match, the shape of the macro concave-convex structure 12 approximately matches the macro concave-convex structure 17A. However, in the case in which the inorganic resist constituting the inorganic resist layer 17 and the material of the base material 11 are different, the etch rate of the inorganic resist layer 17 with respect to the superimposed structure-forming gas and the etch rate of the base material 11 with respect to the superimposed structure-forming gas are different. In other words, the selectivity ratio of the superimposed structure-forming gas is different. At this point, the selectivity ratio of the superimposed structure-forming gas is the value obtained by dividing the etch rate of the inorganic resist layer 17 with respect to the superimposed structure-forming gas by the etch rate of the base material 11 with respect to the superimposed structure-forming gas. Consequently, the shape of the macro concave-convex structure 12 does not match the macro concave-convex structure 17A exactly. Specifically, the arithmetic average roughness of the macro concave-convex structure 12 is different from the arithmetic average roughness of the macro concave-convex structure 17A.

Additionally, the arithmetic average roughness of the macro concave-convex structure 12 is adjustable by modifying the selectivity ratio of the superimposed structure-forming gas. The method of modifying the selectivity ratio of the superimposed structure-forming gas may be, for example, modifying the combination of the inorganic resist constituting the inorganic resist layer 17 and the material of the base material 11.

Additionally, in the case of increasing the selectivity ratio of the superimposed structure-forming gas, the etch rate of the inorganic resist layer 17 increases while the etch rate of the base material 11 decreases, and thus the arithmetic average roughness of the macro concave-convex structure 12 decreases. In other words, the macro concave-convex structure 12 becomes shallower. On the other hand, in the case of decreasing the selectivity ratio of the superimposed structure-forming gas, the etch rate of the inorganic resist layer 17 decreases while the etch rate of the base material 11 increases, and thus the arithmetic average roughness of the macro concave-convex structure 12 increases. In other words, the macro concave-convex structure 12 becomes deeper.

In this way, according to the present embodiment, by modifying the combination of the inorganic resist constituting the inorganic resist layer 17 and the material of the base material 11, the selectivity ratio of the superimposed structure-forming gas can be adjusted, and by extension, the arithmetic average roughness of the macro concave-convex structure 12 can be adjusted. For this reason, in the case in which the arithmetic average roughness of the macro concave-convex structure 17A formed in the inorganic resist layer 17 is different from the desired value, for example, by further adjusting the selectivity ratio of the superimposed structure-forming gas, the arithmetic average roughness of the macro concave-convex structure 12 can be set to the desired value. Note that the average cycle of the macro concave-convex structure 12 approximately matches the average cycle of the macro concave-convex structure 17A.

Consequently, according to the present embodiment, the average cycle of the macro concave-convex structure 12 can be adjusted by adjusting the average grain size and concentration of the filler particles 192, and the arithmetic average roughness of the macro concave-convex structure 12 can be adjusted by adjusting the selectivity ratio of the macro concave-convex structure-forming gas and the selectivity ratio of the superimposed structure-forming gas. Consequently, a macro concave-convex structure 12 having the desired average cycle and arithmetic average roughness can be formed.

[1.2.1. First Modification of Master Manufacturing Method]

Figure 11:
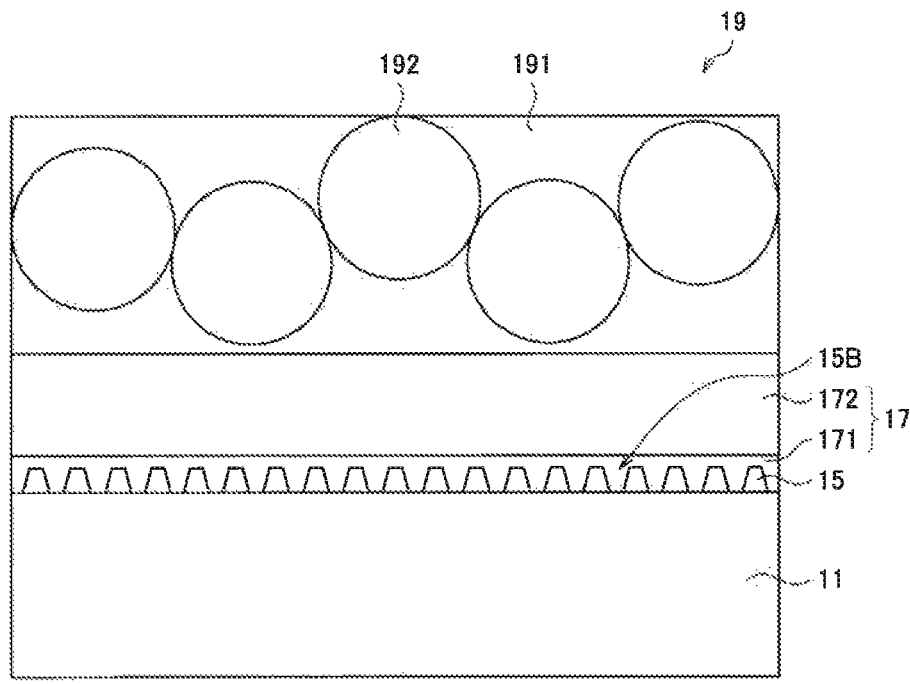
FIG. 11 is a cross-section diagram for explaining a first modification of a master manufacturing method.

Next, a first modification of the master manufacturing method will be described with reference to FIG. 11. As illustrated in FIG. 11, in the first modification, the inorganic resist layer 17 is taken to have a two-layer structure. In other words, in the first modification, the inorganic resist layer 17 is made up of a first inorganic resist layer 171 formed on the micro concave-convex structure 15B, and a second inorganic resist layer 172 formed on the first inorganic resist layer 171. Each of the inorganic resist layers 171 and 172 is formed by a method similar to the second step described above.

The inorganic resist constituting the first inorganic resist layer 171 and the second inorganic resist layer 172 may be, for example, $SiO_2$, Si, diamond-like carbon (DLC), W, Mo, or a metallic oxide including one or multiple types of transition metals such as W and Mo. Herein, the first inorganic resist layer 171 and the second inorganic resist layer 172 are made up of different inorganic resists (specifically, the etch rates are different). Furthermore, the etch rate of the second inorganic resist layer 172 is different from the etch rate of the base material resist layer 15. The other steps are all the same as the steps described earlier.

With the first modification, the following advantageous effects are obtained. Namely, as described above, the arithmetic average roughness of the macro concave-convex structure 17A can be adjusted by adjusting the selectivity ratio of the macro concave-convex structure-forming gas. Additionally, the selectivity ratio of the macro concave-convex structure-forming gas can also be adjusted by the combination of the organic resist and the inorganic resist constituting the inorganic resist layer 17. Consequently, in the case in which the inorganic resist layer 17 and the base material resist layer 15 are made up of the same inorganic resist, the arithmetic average roughness of the macro concave-convex structure 17A becomes the desired value in some cases. However, if the inorganic resist layer 17 is taken to have a single layer, and is also formed from the same inorganic resist as the base material resist layer 15, the micro concave-convex structure 13 cannot be formed.

Meanwhile, the selectivity ratio of the macro concave-convex structure-forming gas is determined by the combination of the organic resist, and the inorganic resist in the portion of the inorganic resist layer 17 that contacts the organic resist layer 19.

Consequently, in the first modification, the portion that contacts the organic resist layer 19, namely the second inorganic resist layer 172, can be formed from an inorganic resist that is the same as the base material resist layer 15, while the first inorganic resist layer 171 can be formed from an inorganic resist that is different from the base material resist layer 15. In other words, according to the first modification, the choice of materials for the second inorganic resist layer 172 can be increased.

Note that the thickness ratio of the first inorganic resist layer 171 and the second inorganic resist layer 172 is not particularly limited, and may be set in accordance with the etch rates of the first inorganic resist layer 171 and the second inorganic resist layer 172. For example, it is sufficient to set the thickness of a layer with a fast etch rate in proportion with the etch rate ratio with respect to a layer with a slow etch rate.

[1.2.2. Second Modification of Master Manufacturing Method]

Next, a second modification of the master manufacturing method will be described with reference to FIGS. 4 to 6 and FIG. 12. In the second modification, the first step and the second step are different.

Figure 12:
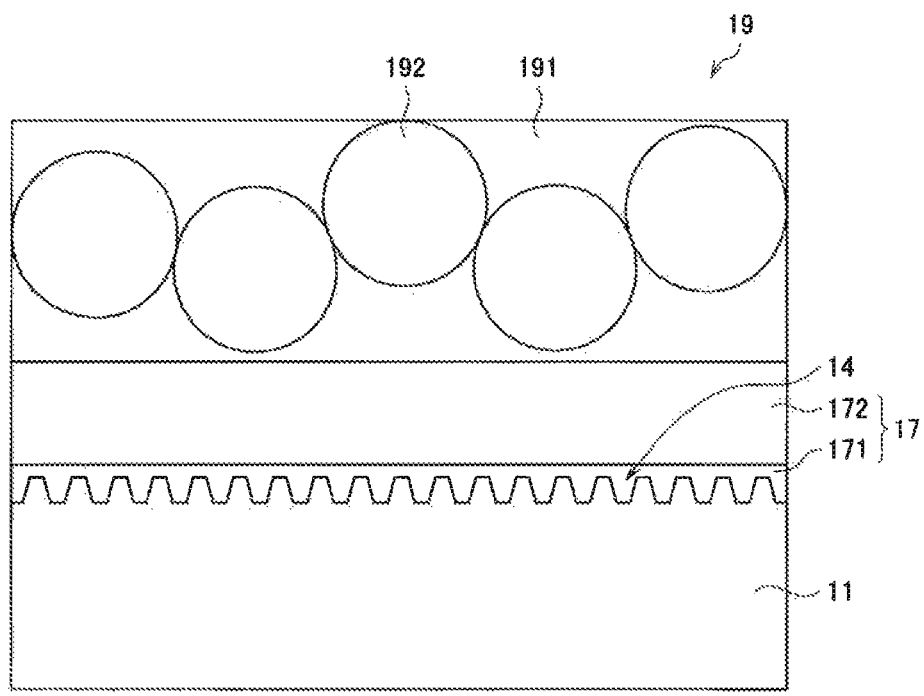
FIG. 12 is a cross-section diagram for explaining a second modification of a master manufacturing method.

In the first step, as illustrated in FIGS. 4 to 6, the base material resist layer 15 is formed on the base material 11, and the micro concave-convex structure 15B (third micro concave-convex structure) is formed in the base material resist layer 15. Subsequently, the base material resist layer 15 and the base material 11 are etched by a method similar to the second etching described above. With this arrangement, the micro concave-convex structure 14 (first micro concave-convex structure) illustrated in FIG. 12 is formed on the surface of the base material 11. Consequently, in the second modification, the base material 11 constitutes a base material body. The micro concave-convex structure 14 has the same arrangement pattern (the arrangement pattern of concavities and convexities) as the micro concave-convex structure 15B.

In the second step, similarly to the first modification, an inorganic resist layer 17 with a two-layer structure is formed on the micro concave-convex structure 14. At this point, the first inorganic resist layer 171 is a resist layer for forming the micro concave-convex structure 13 in the base material 11, and is made of DLC. The second inorganic resist layer 172 is made of an inorganic resist similar to the first modification (excluding DLC). After that, processes similar to the processes described above are conducted.

<2. Configuration of Exposure Device>

Figure 13:
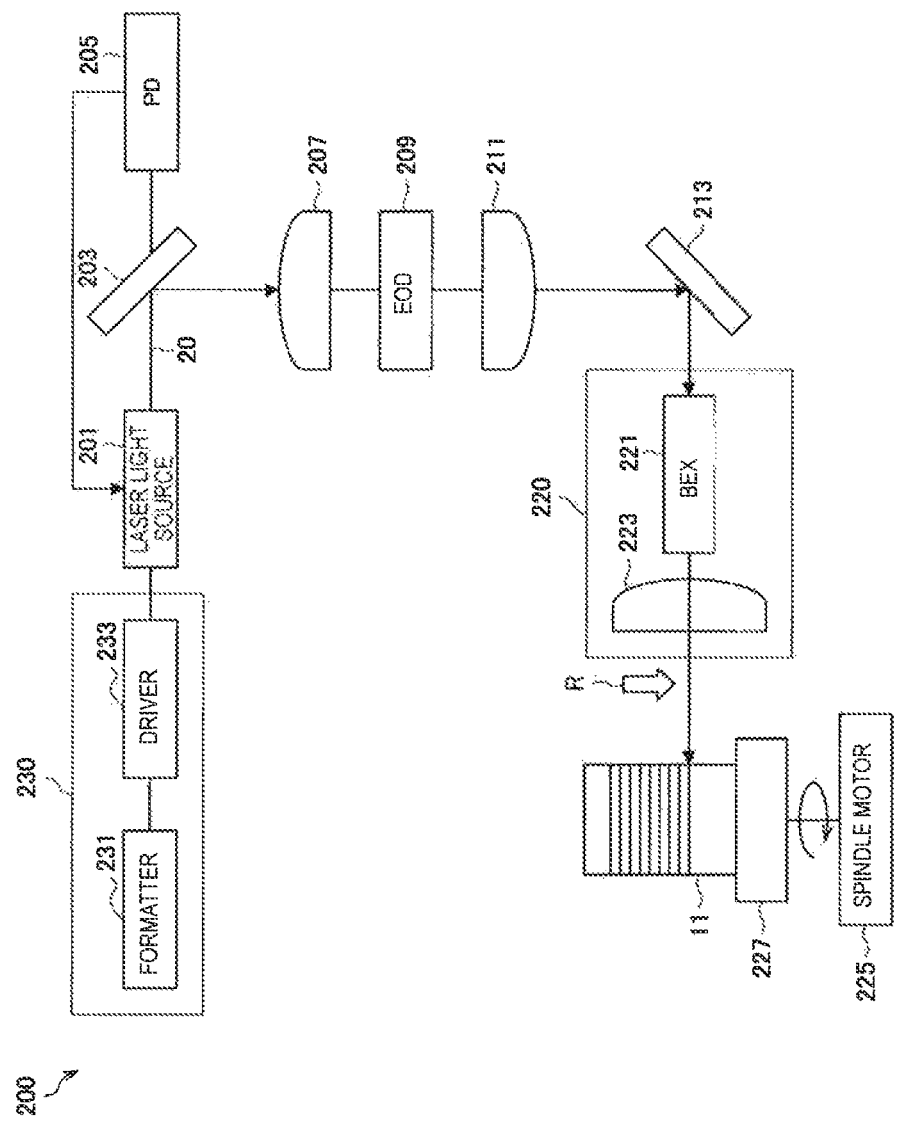
FIG. 13 is a block diagram illustrating an exemplary configuration of an exposure device usable in the present embodiment.

Next, the configuration of the exposure device 200 will be described based on FIG. 13. The exposure device 200 is a device that exposes the base material resist layer 15. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the base material 11 is placed on the turntable 227 and able to be rotated.

The laser light source 201 is a light source that emits laser light 20, and is a device such as a solid-state laser or a semiconductor laser, for example. The wavelength of the laser light 20 emitted by the laser light source 201 is not particularly limited, but may be a wavelength in the blue light band from 400 nm to 500 nm, for example. Also, it is sufficient for the spot diameter of the laser light 20 (the diameter of the spot radiated onto the resist layer) to be smaller than the diameter of the open face of a concavity of the micro concave-convex structure 15B, such as approximately 200 nm, for example. The laser light 20 emitted from the laser light source 201 is controlled by the control mechanism 230.

The laser light 20 emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is sensed by the photodiode 205 and photoelectrically converted. Also, the photodetection signal photoelectrically converted by the photodiode 205 is input into the laser light source 201, and the laser light source 201 conducts phase modulation of the laser light 20 based on the input photodetection signal.

In addition, the deflecting optical system is provided with a condenser lens 207, an electro-optic deflector (EOD) 209, and a collimator lens 211.

In the deflecting optical system, the laser light 20 is condensed onto the electro-optic deflector 209 by the condenser lens 207. The electro-optic deflector 209 is an element capable of controlling the radiation position of the laser light 20. With the electro-optic deflector 209, the exposure device 200 is also able to vary the radiation position of the laser light 20 guided onto the movable optical table 220. After the radiation position is adjusted by the electro-optic deflector 209, the laser light 20 is converted back into a collimated beam by the collimator lens 211. The laser light 20 exiting the deflecting optical system is reflected by the second mirror 213, and guided level with and parallel to the movable optical table 220.

The movable optical table 220 is provided with a beam expander (BEX) 221 and an objective lens 223. The laser light 20 guided to the movable optical table 220 is shaped into a desired beam shape by the beam expander 221, and then radiated via the objective lens 223 onto the base material resist layer 15 formed on the base material 11. In addition, the movable optical table 220 moves by one feed pitch (track pitch) in the direction of the arrow R (feed pitch direction) every time the base material 11 undergoes one rotation. The base material 11 is placed on the turntable 227. The spindle motor 225 causes the turntable 227 to rotate, thereby causing the base material 11 to rotate.

In addition, the control mechanism 230 is provided with a formatter 231 and a driver 233, and controls the radiation of the laser light 20. The formatter 231 generates a modulation signal that controls the radiation of the laser light 20, and the driver 233 controls the laser light source 201 based on the modulation signal generated by the formatter 231. As a result, the irradiation of the base material 11 by the laser light 20 is controlled.

The formatter 231 generates a control signal for irradiating the base material resist layer 15 with the laser light 20, based on an input image depicting an arbitrary pattern to draw on the base material resist layer 15. Specifically, first, the formatter 231 acquires an input image depicting an arbitrary pattern to draw on the base material resist layer 15. The input image is an image corresponding to a development of the outer circumferential surface of the base material resist layer 15, in which the outer circumferential surface of the base material resist layer 15 is cut in the axial direction and expanded in a single plane. Next, the formatter 231 partitions the input image into sub-regions of a certain size (for example, partitions the input image into a lattice), and determines whether or not the draw pattern is included in each of the sub-regions. Subsequently, the formatter 231 generates a control signal to perform control to irradiate with the laser light 20 each sub-region determined to include the draw pattern. Furthermore, the driver 233 controls the output of the laser light source 201 based on the control signal generated by the formatter 231. As a result, the irradiation of the base material resist layer 15 by the laser light 20 is controlled.

<3. Method of Manufacturing Optical Body Using Master>

Next, an example of a method of manufacturing the optical body 4 using the master 1 will be described with reference to FIG. 14. The optical body 4 can be manufactured by a roll-to-roll transfer device 300 using the master 1. In the transfer device 300 illustrated in FIG. 14, the optical body 4 is produced using a light-curing resin.

The transfer device 300 is provided with the master 1, a base material supply roll 301, a take-up roll 302, guide rolls 303 and 304, a nip roll 305, a separation roll 306, an applicator device 307, and a light source 309.

The base material supply roll 301 is a roll around which a long-length base material film 3 is wound in a roll, while the take-up roll 302 is a roll that takes up the optical body 4. Also, the guide rolls 303 and 304 are rolls that transport the base material film 3. The nip roll 305 is a roll that puts the base material film 3 laminated with an uncured resin layer 310, or in other words a transfer film 3a, in close contact with the master 1. The separation roll 306 is a roll that separates the base material film 3 laminated with a cured resin layer 310a, or in other words the optical body 4, from the master 1.

The applicator device 307 is provided with an applicating means such as a coater, and applies an uncured light-curing resin composition to the base material film 3, and forms the uncured resin layer 310. The applicator device 307 may be a device such as a gravure coater, a wire bar coater, or a die coater, for example. Also, the light source 309 is a light source that emits light of a wavelength able to cure the light-curing resin composition, and may be a device such as an ultraviolet lamp, for example.

The light-curing resin composition is a resin that decreases in fluidity and cures by being irradiated with light of a predetermined wavelength. Specifically, the light-curing resin composition may be an ultraviolet curable resin such as an acrylic resin. The light-curing resin composition may contain an initiator, a filler, a functional additive, a solvent, an inorganic material, a pigment, an antistatic agent, a sensitizing dye, etc., as necessary.

In the transfer device 300, first, the base material film 3 is sent continuously from the base material supply roll 301 via the guide roll 303. Note that partway through the delivery, the base material supply roll 301 may also be changed to a base material supply roll 301 of a separate lot. The uncured light-curing resin composition is applied by the applicator device 307 to the delivered base material film 3, and the uncured resin layer 310 is laminated onto the base material film 3. As a result, the transfer film 3a is prepared. The transfer film 3a is put into close contact with the master 1 by the nip roll 305. The light source 309 irradiates with light the uncured resin layer 310 put in close contact with the master 1, thereby curing the uncured resin layer 310. With this arrangement, the arrangement pattern of the macro concave-convex structure 12 and the micro concave-convex structure 13 formed on the outer circumferential face of the master 1 is transferred to the uncured resin layer 310. In other words, there is formed the cured resin layer 310a, on which is formed the inverse pattern of the macro concave-convex structure 12 and the micro concave-convex structure 13. At this point, the light source 309 may also radiate light obliquely with respect to concavities 422 of the micro concave-convex structure 42 (see FIG. 15). In this case, only a part of the concavities 422 is cured. Next, the base material film 3 on which is laminated the cured resin layer 310a, or in other words the optical body 4, is separated from the master 1 by the separation roll 306. Next, the optical body 4 is taken up by the take-up roll 302 via the guide roll 304.

In this way, in the transfer device 300, the circumferential shape of the master 1 is transferred to the transfer film 3a while transporting the transfer film 3a roll-to-roll. With this arrangement, the optical body 4 is produced.

Note that in the case of producing the optical body 4 with a thermoplastic resin, the applicator device 307 and the light source 309 become unnecessary. Also, the base material film 3 is taken to be a thermoplastic resin film, and a heater device is disposed farther upstream than the master 1. The base material film 3 is heated and softened by the heater device, and after that, the base material film 3 is pressed against the master 1. With this arrangement, the arrangement pattern of the macro concave-convex structure 12 and the micro concave-convex structure 13 formed on the circumferential surface of the master 1 is transferred to the base material film 3. Note that the base material film 3 may also be taken to be a film made up of a resin other than a thermoplastic resin, and the base material film 3 and a thermoplastic resin film may be laminated. In this case, the laminated film is pressed against the master 1 after being heated by the heater device.

Consequently, the transfer device 300 is able to continuously produce a transfer product to which has been transferred the arrangement pattern of the macro concave-convex structure 12 and the micro concave-convex structure 13 formed in the master 1, or in other words, the optical body 4. Herein, the macro concave-convex structure 12 formed on the circumferential face of the master 1 has the desired average cycle and arithmetic average roughness. Consequently, the macro concave-convex structure 41 formed in the optical body 4 (see FIG. 15) has the desired average cycle and arithmetic average roughness.

<4. Structure of Optical Body>
[4-1. Overall Configuration of Optical Body]

Figure 15:
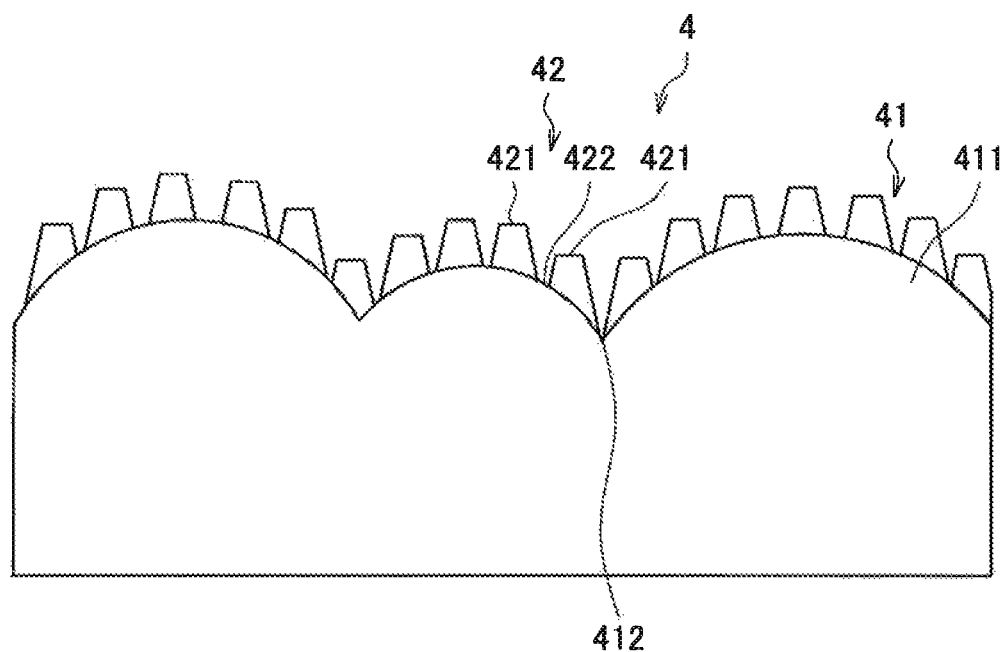
FIG. 15 is a cross-section diagram that schematically illustrates the surface shape of an optical body.

FIG. 15 illustrates the configuration of the optical body 4 produced by the above manufacturing method. The optical body 4 is film-shaped, for example, and is provided with a macro concave-convex structure 41 formed on the surface thereof, and a micro concave-convex structure 42 superimposed onto the macro concave-convex structure 41.

The macro concave-convex structure 41 has convexities 411 and concavities 412. The shape of the macro concave-convex structure 41 is the inverse shape of the macro concave-convex structure 12 of the master 1. The micro concave-convex structure 42 has convexities 421 and concavities 422. The shape of the micro concave-convex structure 42 is the inverse shape of the micro concave-convex structure 13 of the master 1. Furthermore, the optical body 4 according to the present embodiment is able to realize a high anti-glare function with the macro concave-convex structure 41, and a high anti-reflection function with the micro concave-convex structure 42. Consequently, it is not necessary to mix into the optical body 4 a separate scatterer in order to improve the anti-glare function of the optical body 4. Consequently, according to the present embodiment, an optical body 4 having a high anti-glare function and a high anti-reflection function can be produced consistently and at low cost.

[4.2. Average Cycle and Arithmetic Average Roughness of Optical Body]

The arithmetic average roughness of the optical body 4 is the arithmetic average roughness of the superimposed structure of the macro concave-convex structure 41 and the micro concave-convex structure 42. Herein, in the present embodiment, the arithmetic average roughness of the macro concave-convex structure 41 approximately matches the arithmetic average roughness of the macro concave-convex structure 12 of the master 1. Additionally, in the present embodiment, when producing the master 1, it is possible to keep the arrangement pattern of the micro concave-convex structure 13 fixed while arbitrarily varying only the shape of the macro concave-convex structure 12. Consequently, in the present embodiment, it is possible to produce a variety of optical bodies 4 with a different arithmetic average roughness of the superimposed structure while the arrangement pattern of the micro concave-convex structure 42 remains fixed. Hereinafter, unless specifically noted otherwise, the "arithmetic average roughness of the optical body 4" is taken to mean the "arithmetic average roughness of the superimposed structure of the optical body 4". Meanwhile, the average cycle of the optical body 4 is the average cycle of the macro concave-convex structure 41.

<5. Relationship between Average Cycle and Arithmetic Average Roughness, and Haze Value of Optical Body>

Figure 16:
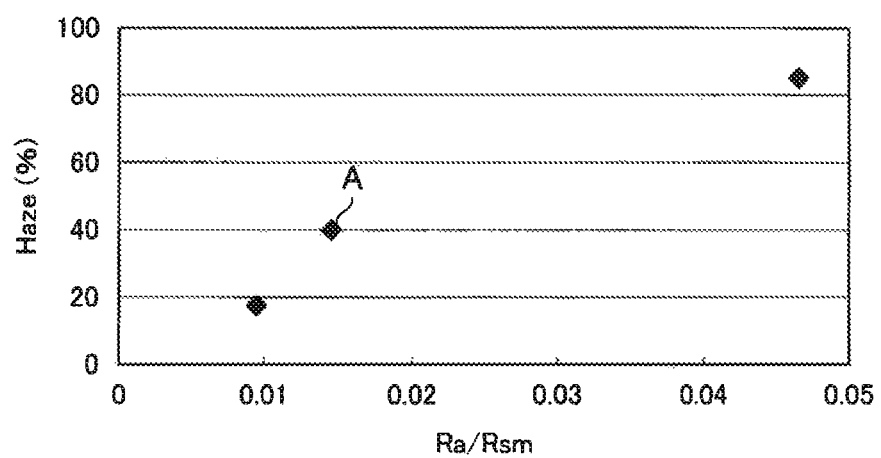
FIG. 16 is a graph illustrating a correlation between Ra/Rsm and the haze value.

As described above, according to the present embodiment, the average cycle and the arithmetic average roughness of the optical body 4 can be set to desired values. Additionally, after a detailed investigation of the average cycle and the arithmetic average roughness of the optical body 4, the inventors discovered that there is a tight correlation between these values and the haze value of the optical body 4. An example of the correlation between the average cycle and arithmetic average roughness of the optical body 4 and the haze value of the optical body 4 is illustrated in FIG. 16. The horizontal axis in FIG. 16 expresses a value (=Ra/Rsm) obtained by dividing the arithmetic average roughness (=Ra) by the average cycle (=Rsm) of the optical body 4. The vertical axis expresses the haze value (%) of the optical body 4.

The points A indicate correlations between Ra/Rsm and the haze value. Note that the correlations indicated by the points A are the ones obtained by the examples to be described later. As FIG. 16 clearly demonstrates, as Ra/Rsm increases, the haze value also increases. Also demonstrated is that the amount of increase in the haze value per unit increase in Ra/Rsm becomes greater as Ra/Rsm becomes smaller. Consequently, according to the present embodiment, an optical body 4 having the desired haze value can be produced consistently. Particularly, in the related art, an optical body with a high haze value could not be produced consistently. In other words, even with the technology of the related art, an optical body with a high haze value could be produced by polishing the optical body. However, the quality fluctuations were severe, and did not stand up to practical use. In the present embodiment, an optical body with a haze value can be produced consistently.

<6. Exemplary Applications of Optical Body>

The optical body 4 produced by the present embodiment is applicable to a variety of uses. For example, the optical body 4 can be used as an anti-reflection film and an anti-glare film for display devices, optical elements, and the like. The optical body 4 is not limited to these uses, and is applicable to any field demanding anti-reflection and anti-glare.

EXAMPLES

Hereinafter, the master 1 and the optical body 4 according to the foregoing embodiment will be described specifically with reference to examples and comparative examples. Note that the examples indicated below are conditional examples for indicating the embodiment possibilities and advantageous effects of the master 1 and the optical body 4 according to the foregoing embodiment, and a master 1 and optical body 4 of the present invention are not limited to the examples below.

[1. Manufacture of Optical Body]

The optical body 4 was manufactured according to the following steps.

Example 1

A base material 11 made of silica glass in a hollow round cylindrical shape was prepared, and a base material resist layer 15 made of tungsten oxide was formed on the surface of the base material 11 by sputtering. The base material resist layer 15 was taken to be 50 nm thick. Next, by irradiating the base material resist layer with laser light from the exposure device 200 illustrated in FIG. 13, a latent image 15A of the staggered arrangement pattern was formed in the base material resist layer 15. At this point, the set values in the exposure device 200 related to the pitch of the latent image 15A were taken to be a dot pitch of 230 nm and a track pitch of 153 nm.

Next, by dripping an alkaline developing solution (NMD-3 by Tokyo Ohka Kogyo Co., Ltd.) onto the base material resist layer 15, the exposed part (the portion where the latent image 15A is formed) was removed. In other words, a development process was conducted. With this arrangement, the micro concave-convex convex structure 15B was formed in the base material resist layer 15.

Next, an inorganic resist layer 17 made of $SiO_2$ was formed on the micro concave-convex structure 15B by sputtering. Herein, the inorganic resist layer 17 is taken to be a single layer, with a thickness of 1000 nm. Also, the etch rate of the inorganic resist layer 17 with respect to the superimposed structure-forming gas (the composition of which will be described later) was different from the etch rate of the base material resist layer 15 with respect to the superimposed structure-forming gas. Specifically, the ratio of the etch rate of the base material resist layer 15 to the etch rate of the inorganic resist layer 17 was 1/3. Note that the etch rates of both were measured by etching a single layer of the inorganic resist layer 17 and a single layer of the base material resist layer 15 under the conditions of the second etching to be described later.

Next, P4210 by AZ Electronic Materials was prepared as the organic resist 191, and acrylic particles (SE010T by Negami Chemical Industrial Co., Ltd.) were prepared as the filler particles 192. At this point, when the average grain size of the acrylic particles were measured with a microscope, the average grain size was 10 μm.

Subsequently, by mixing the organic resist 191 and the filler particles 192 at a weight ratio of 70:30, an organic resist composition was produced. Subsequently, by mixing this organic resist composition with the solvent PGM (propylene glycol monomethyl ether) at a weight ratio of 1:20, a spray coating dispersion fluid was produced.

Next, by spraying the spray coating dispersion fluid onto the inorganic resist layer 17, an organic resist layer 19 from 10 μm to 15 μm thick was formed. In this way, the thickness of the organic resist layer 19 takes various values on the surface of the organic resist layer 19, but the thickness always takes a value within the above range. In other words, in Example 1, the organic resist layer 19 was formed on the inorganic resist layer 17 by spray coating. Note that the solvent PGM volatilizes while being sprayed and also when left out in open air.

Next, a reactive ion etching device was used to conduct the first etching. The macro concave-convex structure-forming gas used in the first etching was a gas obtained by mixing $CF_4$ gas and $O_2$ gas at a flow ratio (sccm ratio) of 2:28. Also, the output of the reactive ion etching device was taken to be 200 W, and the gas pressure was taken to be 0.5 Pa.

Note that when etching was interrupted during the etching of the organic resist layer 19, and the surface of the organic resist layer 19 was observed with an SEM and a microscope, it was confirmed that the macro concave-convex structure 19A was formed on the surface of the organic resist layer 19. Also, from the shape of the macro concave-convex structure 19A (particularly, the depth of the concavities), the ratio of the etch rate of the organic resist with respect to the macro concave-convex structure-forming gas and the etch rate of the filler particles 192 with respect to macro concave-convex structure-forming gas was estimated. As a result, the ratio of the etch rates was 1/2.

Also, the selectivity ratio of the macro concave-convex structure-forming gas was 25/1. Note that the selectivity ratio was computed according to the following method. Namely, a single layer of the organic resist 191 and a single layer of $SiO_2$ were etched under the above etching conditions, and the etch rates of both were measured. Subsequently, the selectivity ratio was computed by dividing the etch rate of the organic resist 191 by the etch rate of the inorganic resist layer 17.

Subsequently, when the organic resist layer 19 disappeared completely (that is, when the macro concave-convex structure 19A of the organic resist layer 19 was entirely transferred to the inorganic resist layer 17), the first etching was ended. After that, when the surface of the inorganic resist layer 17 was observed with an SEM, it was confirmed that the macro concave-convex structure 17A was formed on the surface of the inorganic resist layer 17.

Next, a reactive ion etching device was used to conduct the second etching. The superimposed structure-forming gas used in the second etching was a gas obtained by mixing $CHF_3$ gas and $CF_4$ gas at a flow ratio (sccm ratio) of 27:3. Also, the output of the reactive ion etching device was taken to be 200 W, the gas pressure was taken to be 0.5 Pa, and the etching time was taken to be 2 hours. By the above steps, the master 1 according to Example 1 was produced.

Herein, the selectivity ratio of the superimposed structure-forming gas was 1/3. Note that the selectivity ratio was computed according to the following method. Namely, the base material 11 and a single layer of $SiO_2$ were etched under the above etching conditions, and the etch rates of both were measured. Subsequently, the selectivity ratio was computed by dividing the etch rate of the organic resist 191 by the etch rate of the inorganic resist layer 17.

Figure 14:
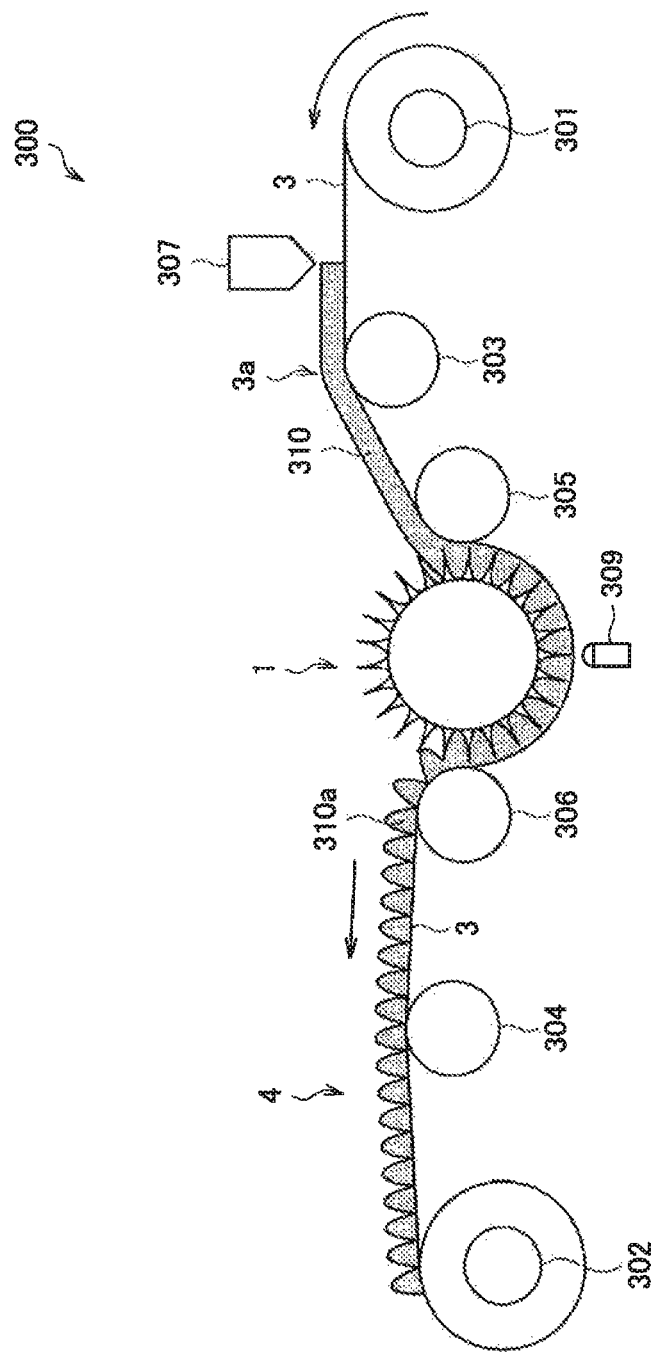
FIG. 14 is a schematic diagram illustrating an example of a transfer device using a master according to the present embodiment.

Next, the transfer device 300 illustrated in FIG. 14 was used to produce the optical body 4. Note that the base material film 3 was taken to be polyethylene terephthalate film, and the light-curing resin composition was taken to be acrylic resin acrylate. Also, the uncured resin layer 310 was cured by irradiating the uncured resin layer 310 with ultraviolet rays at 1000 mJ/cm$^2$. By the above steps, the optical body 4 was produced. Subsequently, the Surfcorder ET200 by Kosaka Laboratory Ltd. was used to measure the arithmetic average roughness and the average cycle of the optical body 4. Herein, the measurement conditions were set to a speed of 100 µm/s and a measurement strength of 100 µN. As a result, the arithmetic average roughness (=Ra) was 0.151 µm, and the average cycle (=Rsm) was 10.39 µm. Consequently, Ra/Rsm was 0.014. Also, the dot pitch of the micro concave-convex structure 42 of the optical body 4 was 270 nm, the track pitch was 153 nm, and the depth (the height of the convexities 421 and the depth of the concavities 422) was approximately from 500 nm to 600 nm. These values were confirmed with an SEM and a cross-section transmission electron microscope (TEM).

Example 2

Other than conducting the first etching twice before conducting the second etching, a process similar to Example 1 was conducted. Note that the second round of the first etching was conducted under the same conditions of the first round of the first etching. For example, the spray coating dispersion fluid was sprayed onto the inorganic resist layer 17 under the same spraying conditions (such as the spray pressure and the spray time) as the first round of the first etching. When the arithmetic average roughness and the average cycle of the optical body 4 were measured by a method similar to Example 1, the arithmetic average roughness was 0.112 µm, and the average cycle was 11.8 µm. Consequently, Ra/Rsm was 0.009. Also, it was demonstrated that by repeatedly conducting the first etching, the average cycle of the optical body 4 can be increased, and the arithmetic average roughness can be decreased. Consequently, by repeatedly conducting the first etching, the average cycle of the macro concave-convex structure 17A can be increased, and the arithmetic average roughness can be decreased. Also, the dot pitch, track pitch, and depth of the micro concave-convex structure 42 of the optical body 4 were on a comparable level to Example 1. These values were confirmed with an SEM.

Example 3

In Example 3, the average grain size of the filler particles 192 was taken to be 6 µm, the inorganic resist layer 17 was given a two-layer structure, and the composition of the macro concave-convex structure-forming gas was changed. Otherwise, a process similar to Example 1 was conducted. Specifically, in Example 3, a first inorganic resist layer 171 made of Sift was formed on the micro concave-convex structure 15B by sputtering. The first inorganic resist layer 171 was taken to be 200 nm thick. Next, a second inorganic resist layer 172 made of tungsten oxide was formed on the first inorganic resist layer 171 by sputtering. The second inorganic resist layer 172 was taken to be 500 nm thick. Consequently, Example 3 corresponds to the first modification.

Next, other than using acrylic particles with an average grain size of 6 µm (SE006T by Negami Chemical Industrial Co., Ltd.), a spray coating dispersion fluid was produced according to a method similar to Example 1. Next, by spraying the spray coating dispersion fluid onto the second inorganic resist layer 172 according to a method similar to Example 1, the organic resist layer 19 was formed on the second inorganic resist layer 172.

Next, the first etching and the second etching were conducted according to methods similar to Example 1. However, the macro concave-convex structure-forming gas was a gas obtained by mixing $CF_4$ gas and $O_2$ gas at a flow ratio (sccm ratio) of 5:25. When the arithmetic average roughness and the average cycle of the macro concave-convex structure 41 formed in the optical body 4 was measured according to a method similar to Example 1, the arithmetic average roughness was 0.311 µm, and the average cycle was 6.69 µm. Consequently, Ra/Rsm was 0.046. Also, the dot pitch, track pitch, and depth of the micro concave-convex structure 42 of the optical body 4 were on a comparable level to Example 1. These values were confirmed with an SEM.

Example 4

In Example 4, the optical body 4 was produced by conducting the following process. Namely, first, the micro concave-convex structure 15B was formed on the base material 11 by a process similar to Example 1. Next, a reactive ion etching device was used to etch the base material resist layer 15 and the base material 11. At this point, the etching gas was a gas obtained by mixing $CHF_3$ gas and $CF_4$ gas at a flow ratio (sccm ratio) of 27:3. Also, the output of the reactive ion etching device was taken to be 150 W, the gas pressure was taken to be 0.5 Pa, and the etching time was taken to be 1 hour. By the above steps, the micro concave-convex structure 14 was formed in the base material 11.

Next, a first inorganic resist layer 171 made of DLC was formed by CVD onto the micro concave-convex structure 14. The first inorganic resist layer 171 was taken to be 150 nm thick. Next, a second inorganic resist layer 172 made of tungsten oxide was formed on the first inorganic resist layer 171 by sputtering. The second inorganic resist layer 172 was taken to be 800 nm thick. At this point, the ratio of the etch rate of DLC with respect to the superimposed structure-forming gas and the etch rate of the base material 11 with respect to the superimposed structure-forming gas was 1/3. Note that these etch rates are values measured by a method similar to the method described above.

Next, the organic resist layer 19 was formed on the second inorganic resist layer 172 by a method similar to Example 1. After that, by conducting processes similar to Example 1, the optical body 4 was produced. When the arithmetic average roughness and the average cycle of the optical body 4 were measured by a method similar to Example 1, the arithmetic average roughness was from 0.12 µm to 0.15 µm, and the average cycle was from 11 µm to 15 µm. Note that in Example 4, there was some slight variation in the values of the arithmetic average roughness and the average cycle depending on the measurement position of the optical body 4. Also, the dot pitch, track pitch, and depth of the micro concave-convex structure 42 of the optical body 4 were on a comparable level to Example 1. These values were confirmed with an SEM.

[2. Evaluation Results of Optical Body]
(Relationship between Arithmetic Average Roughness and Average Cycle, and Haze Value of Optical Body)

The haze values of the optical bodies 4 produced in the respective examples above were measured using the Haze Meter HM-150 by Murakami Color Research Laboratory Co., Ltd. Subsequently, points indicating combinations of Ra/Rsm and the haze value were plotted on an xy plane with Ra/Rsm as the horizontal axis and the haze value (%) as the vertical axis. The results are illustrated in FIG. 16. The points A in FIG. 16 indicate correlations between Ra/Rsm and the haze value.

As FIG. 16 clearly demonstrates, as Ra/Rsm increases, the haze value also increases. Also demonstrated is that the amount of increase in the haze value per unit increase in Ra/Rsm becomes greater as Ra/Rsm becomes smaller.

(Observation Results of Optical Body with Electron Microscope)

Figure 17A:
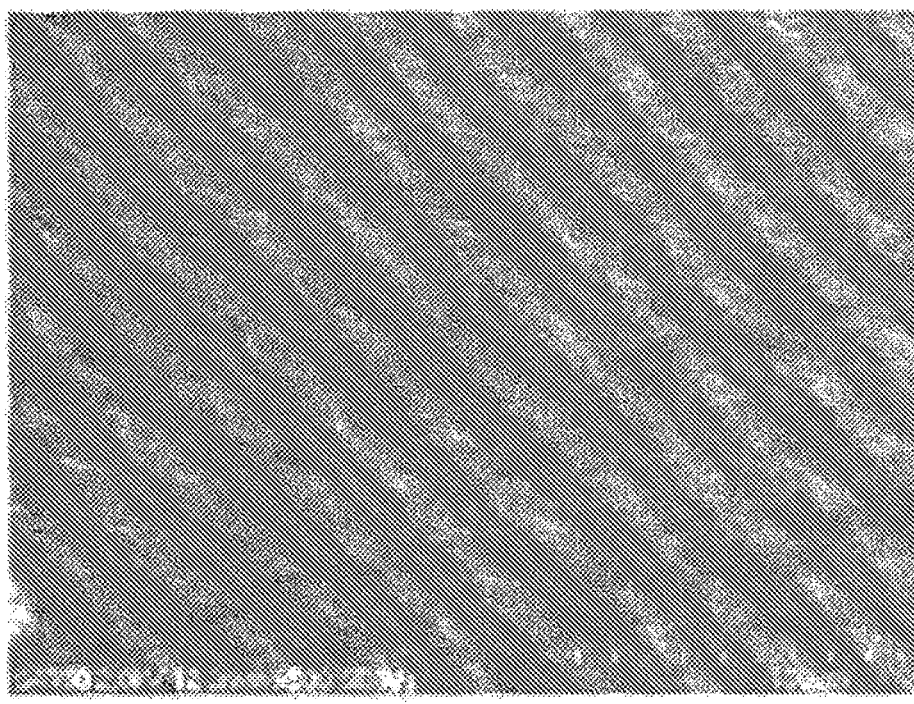
FIG. 17A is a scanning electron microscopic (SEM) photograph of a master produced by Example 2. The magnification is 500×.
Figure 17B:
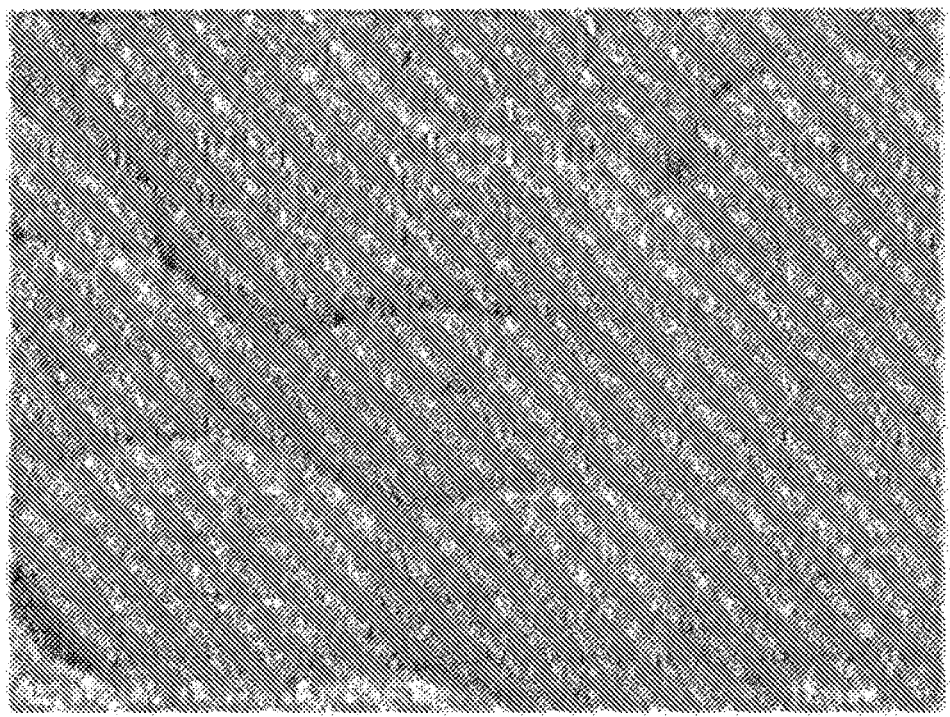
FIG. 17B is a photograph in which the magnification of FIG. 17A is set to 5000×.
Figure 17C:
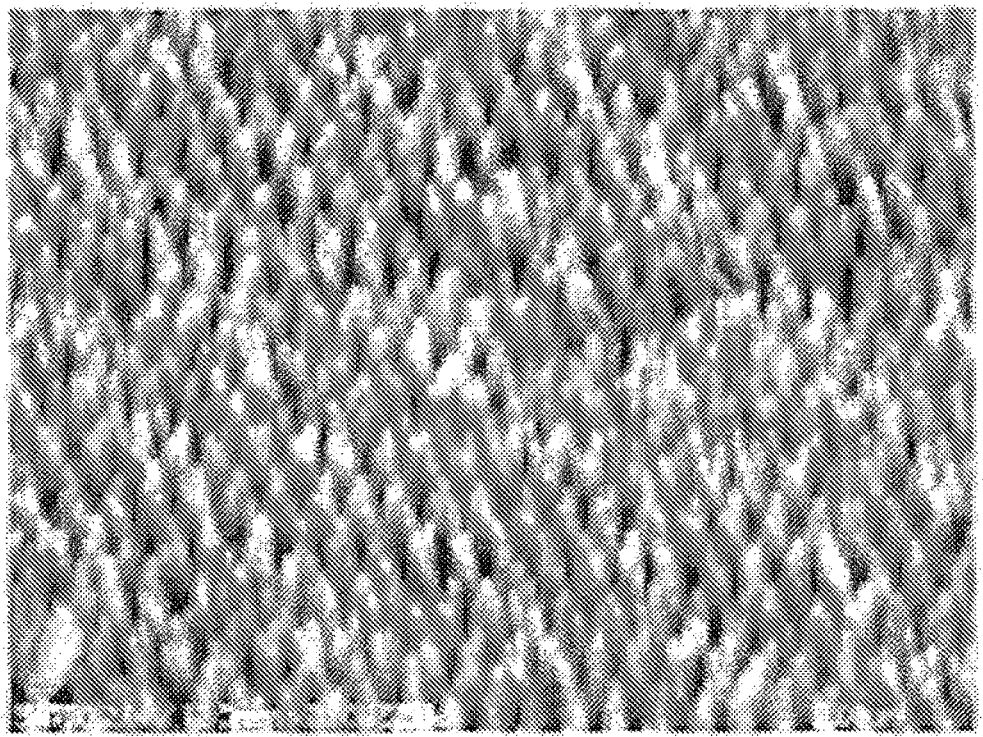
FIG. 17C is a photograph in which the magnification of FIG. 17A is set to 20000×.

First, the surface structure of the optical body 4 produced in Example 2 was observed with an SEM. The results are illustrated in FIGS. 17A to 17C. The magnification in FIG. 17A is 500×, while the magnification in FIG. 17B is 5000×, and the magnification in FIG. 17C is 20000×. FIG. 17A demonstrates that the macro concave-convex structure 12 is formed on the base material 11. Note that the approximately circular structures distributed throughout FIG. 17A are the macro concave-convex structure 12. Also, although extremely minute in FIG. 17B, the formation of the micro concave-convex structure 13 on the same face as the macro concave-convex structure 12 was confirmed. In FIG. 17C, the formation of the micro concave-convex structure 13 on the same face as the macro concave-convex structure 12 was confirmed more clearly.

(Evaluation of Anti-reflection Function of Optical Body)

Figure 18:
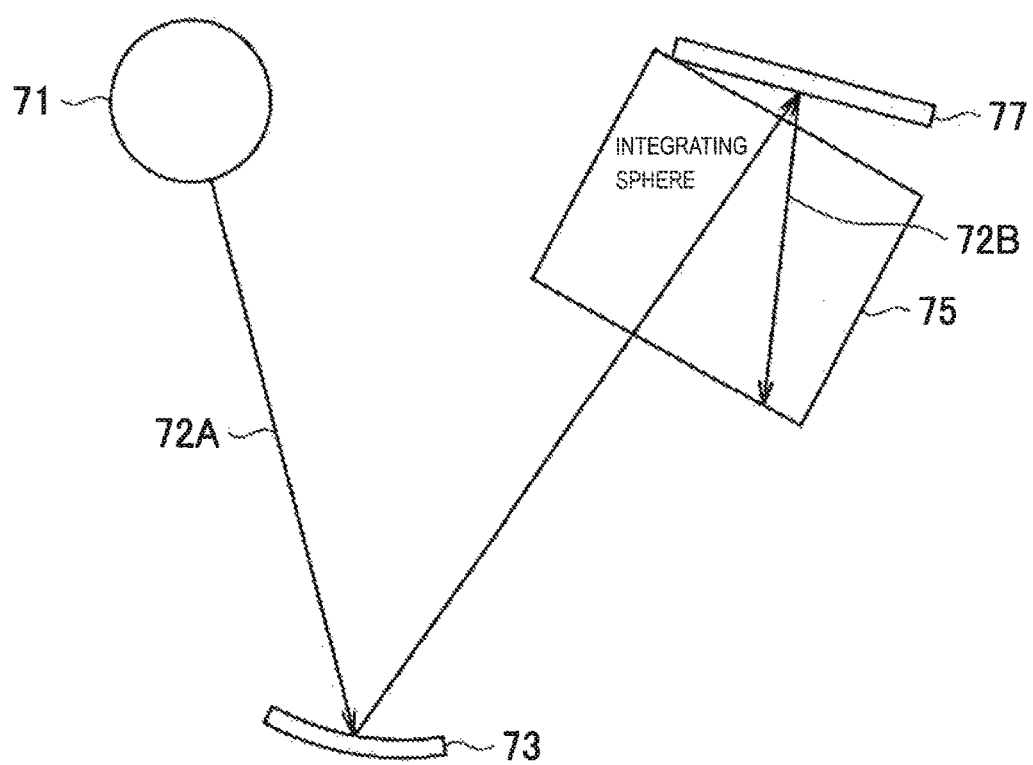
FIG. 18 is a schematic diagram illustrating an optical system that measures the diffuse reflection spectrum.
Figure 19:
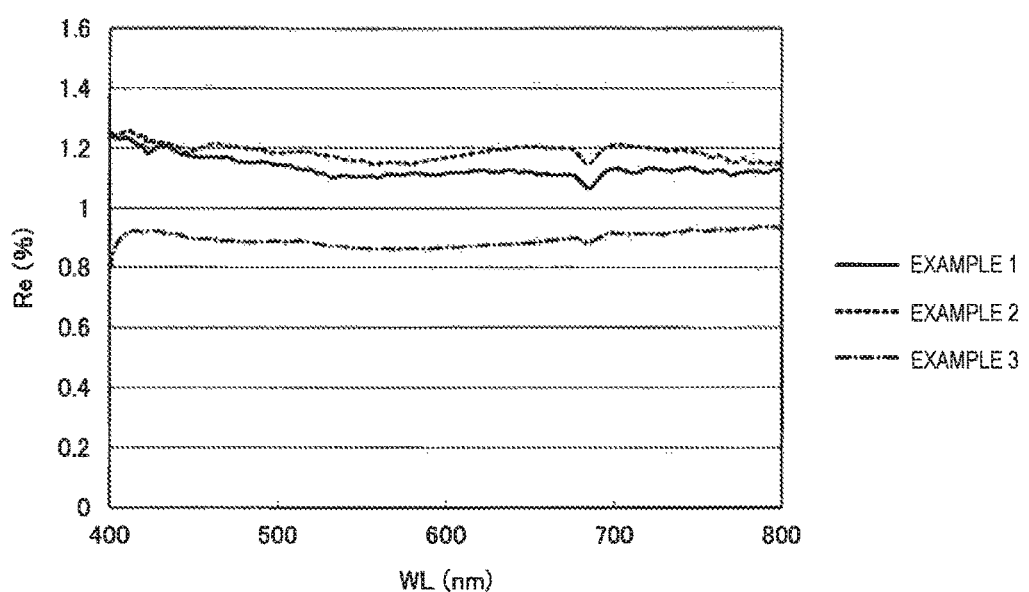
FIG. 19 is a graph illustrating the diffuse reflection spectrum.

To evaluate the anti-reflection function of the optical body 4 produced in each example, the diffuse reflection spectrum of the optical body 4 was measured. First, the optical system used to measure the diffuse reflection spectrum will be described on the basis of FIG. 18. In the measurement of the diffuse reflection spectrum, light 72A from a light source 71 is reflected by a spherical mirror 73, and then radiated onto a sample 77 provided inside an integrating sphere 75. Reflected light 72B from the sample 77 is homogenized by being reflected multiply inside the integrating sphere 75, and then is detected. Specifically, the measurement of the diffuse reflection spectrum was conducted using the V-550 spectrophotometer and the absolute reflectance measuring unit ARV474S by JASCO Corporation. The diffuse reflection spectra are illustrated in FIG. 19. Note that in Example 4, a spectrum comparable to Examples 1 and 2 was obtained. As FIG. 19 clearly demonstrates, the optical bodies according to Examples 1 to 4 have low diffuse reflectance throughout the entire visible light band, and are capable of preventing diffuse reflection sufficiently. In this way, in the examples, even for high haze values of approximately 20% or greater, the diffuse reflectance can be kept to 2% or less.

Also, in Example 3, the haze value has a low diffuse reflectance throughout the visible light band compared to the other examples. Since the macro concave-convex structure 12 of Example 3 has a large height difference in the respective concavities and convexities (that is, the arithmetic average roughness Ra is large) compared to the macro concave-convex structure 12 of the other Examples 1 and 2, when forming the micro concave-convex structure 13, the state of etching is partly different. Consequently, the micro concave-convex structure 13 has a shape that is partly different depending on the shape of the macro concave-convex structure 12. For this reason, in Example 3, it is inferred that reflections can be suppressed over a wider range of wavelengths.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 master
4 optical body
41 macro concave-convex structure
411 convexity
412 concavity
42 micro concave-convex structure
421 convexity
422 concavity
11 base material
12 macro concave-convex structure
121 convexity
122 concavity
13 micro concave-convex structure
131 convexity
132 concavity
14 micro concave-convex structure
15 base material resist layer
15B micro concave-convex structure
17 inorganic resist layer
171 first inorganic resist layer
172 second inorganic resist layer
19 organic resist layer
191 organic resist
192 filler particles

The invention claimed is:
1. A master manufacturing method, comprising:
a first step of forming a first micro concave-convex structure, in which an average cycle of concavities and convexities is less than or equal to visible light wavelengths, on a surface of a base material body that includes at least a base material;
a second step of forming an inorganic resist layer on the first micro concave-convex structure;

a third step of forming, on the inorganic resist layer, an organic resist layer including an organic resist and filler particles distributed throughout the organic resist; and a fourth step of etching the organic resist layer and the inorganic resist layer to thereby superimpose and form on the surface of the base material a macro concave-convex structure in which the average cycle of concavities and convexities is greater than visible light wavelengths, and a second micro concave-convex structure in which the average cycle of concavities and convexities is less than or equal to visible light wavelengths, wherein an average grain size of the filler particles is greater than visible light wavelengths, and an etch rate of the filler particles is different from an etch rate of the organic resist.

2. The master manufacturing method according to claim 1, wherein the etch rate of the filler particles is higher than the etch rate of the organic resist.

3. The master manufacturing method according to claim 1, wherein the average grain size of the filler particles is from 2 μm to 15 μm.

4. The master manufacturing method according to claim 1, wherein in the fourth step, the organic resist layer and the inorganic resist layer are etched by dry etching, and an etching gas used when dry-etching the organic resist layer is different from an etching gas used when dry-etching the inorganic resist layer.

5. The master manufacturing method according to claim 4, wherein the etching gas used when dry-etching the organic resist layer includes a first etching gas and a second etching gas, the etch rate of the organic resist with respect to the first etching gas is higher than the etch rate of the inorganic resist layer with respect to the first etching gas, and the etch rate of the organic resist with respect to the second etching gas is lower than the etch rate of the inorganic resist layer with respect to the second etching gas.

6. The master manufacturing method according to claim 4, wherein the etching gas used in the dry etching includes one or more types of atoms selected from a group consisting of carbon atoms, fluorine atoms, oxygen atoms, and hydrogen atoms.

7. The master manufacturing method according to claim 1, wherein the first step includes a step of producing the base material body by forming a base material resist layer on the surface of the base material, and a step of forming the first micro concave-convex structure in the base material resist layer, and the etch rate of the base material resist layer is different from the etch rate of the inorganic resist layer.

8. The master manufacturing method according to claim 1, wherein the base material body is made of the base material, and the first step includes a step of forming a base material resist layer on the surface of the base material, a step of forming a third micro concave-convex structure having a same arrangement pattern as the first micro concave-convex structure in the base material resist layer, and a step of forming the first micro concave-convex structure on the surface of the base material by etching the base material resist layer.

9. The master manufacturing method according to claim 1, wherein the second step includes a step of forming a first inorganic resist layer on the first micro concave-convex structure, and a step of forming a second inorganic resist layer on the first inorganic resist layer.

* * * * *